(12) United States Patent
Tanaka et al.

(10) Patent No.: US 7,840,141 B2
(45) Date of Patent: Nov. 23, 2010

(54) DIFFERENTIAL M PHASE-SHIFT MODULATOR

(75) Inventors: Toshiki Tanaka, Kawasaki (JP); Hideyuki Miyata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 568 days.

(21) Appl. No.: 11/845,251

(22) Filed: Aug. 27, 2007

(65) Prior Publication Data

US 2008/0112710 A1 May 15, 2008

(30) Foreign Application Priority Data

Nov. 14, 2006 (JP) .............................. 2006-308029

(51) Int. Cl.
*H04B 10/04* (2006.01)
(52) U.S. Cl. ..................... 398/198; 398/183; 398/185; 398/188
(58) Field of Classification Search ............. 398/93–95, 398/162, 183, 185, 188, 195–198
See application file for complete search history.

(56) References Cited

U.S. PATENT DOCUMENTS

| 4,893,352 | A | 1/1990 | Welford |
| 5,170,274 | A | 12/1992 | Kuwata et al. .............. 359/182 |
| 7,116,460 | B2 * | 10/2006 | Griffin ......................... 359/245 |
| 2001/0007508 | A1 | 7/2001 | Ooi et al. ..................... 359/245 |
| 2003/0102938 | A1 | 6/2003 | Erlig et al. |
| 2005/0117191 | A1 | 6/2005 | Griffin ......................... 359/245 |
| 2006/0263098 | A1 | 11/2006 | Akiyama et al. ............ 398/188 |
| 2009/0034967 | A1 * | 2/2009 | Tao et al. ...................... 398/33 |

FOREIGN PATENT DOCUMENTS

| JP | 3-251815 | 11/1991 |
| JP | 2000-162563 | 6/2000 |
| JP | 2004-516743 | 6/2004 |
| JP | 2007-43638 | 2/2007 |
| WO | WO 02/51041 | 6/2002 |
| WO | WO 03/049333 | 6/2003 |

OTHER PUBLICATIONS

European Patent Office Search Report issued Mar. 20, 2008 for corresponding European Patent Application No. 070169131.
English language first page of WIPO Publication No. WO 02/051041, published Jun. 27, 2002.

* cited by examiner

*Primary Examiner*—Dalzid Singh
(74) *Attorney, Agent, or Firm*—Fujitsu Patent Center

(57) ABSTRACT

The present invention is a miniaturized differential M phase-shift modulator ($M=2^n$: n is 2 or more) in which a plurality of Mach-Zehnder type light modulators each adapted to output a DPSK-modulated signal light by applying a driving voltage signal are arranged in parallel and that comprises a multiplexing waveguide adapted to output a DMPSK-modulated light by multiplexing outputs of the plurality of the Mach-Zehnder type light modulators, wherein a phase-shift voltage to produce a phase shift difference of substantially $2\pi/M$ for a plurality of the signal lights multiplexed by the multiplexing waveguide is applied to the plurality of the Mach-Zehnder type light modulators together with the driving voltage signal.

14 Claims, 16 Drawing Sheets

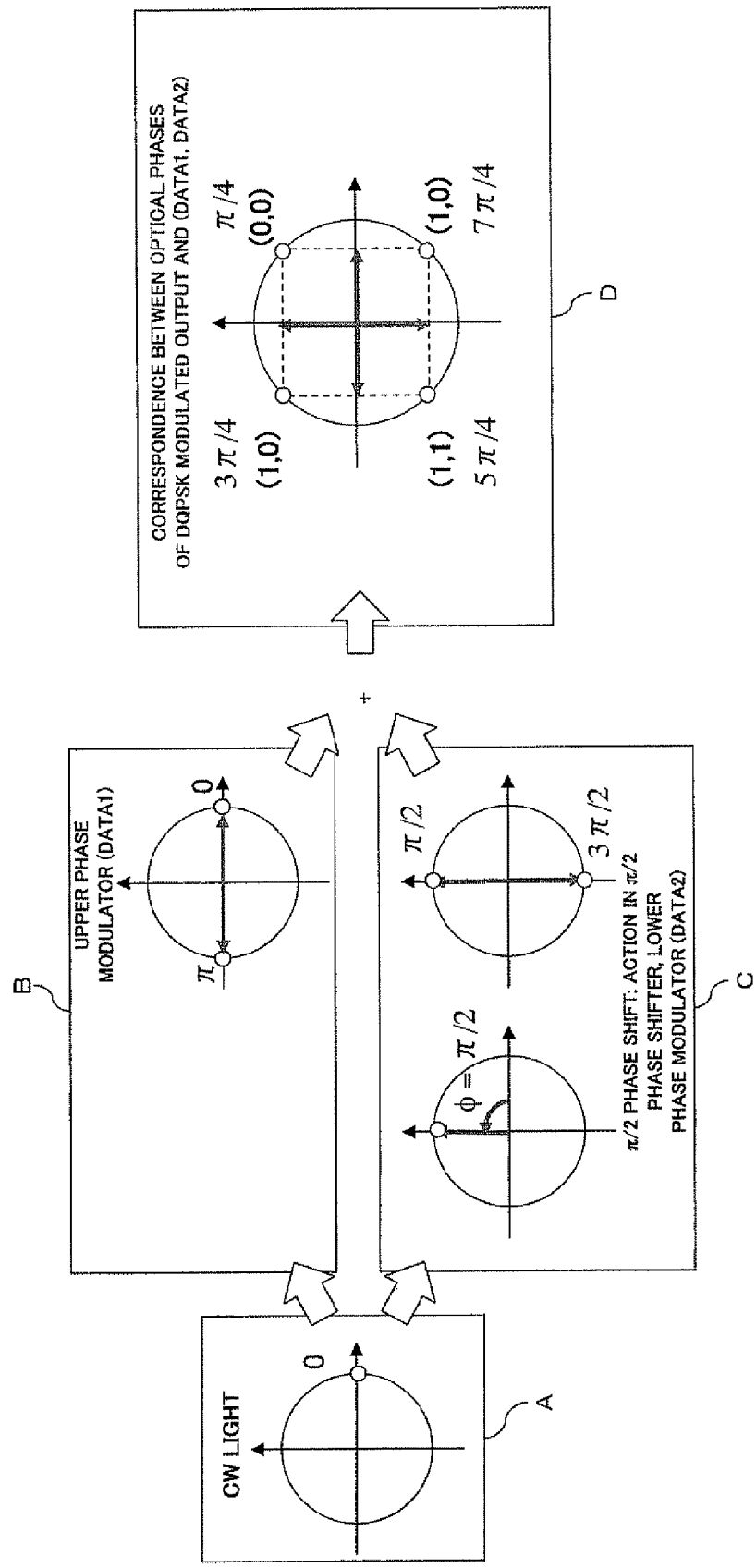

DIFFERENTIAL M PHASE-SHIFT MODULATOR

BACKGROUND OF THE INVENTION

1) Field of the Invention

The present invention relates to a differential M phase-shift modulator (M: M=2$^n$), and particularly to a differential M phase-shift modulator suitable in use for a transmitter in an optical transmission system.

2) Description of the Related Art

In recent years, demand has increasingly been growing for installation of a next-generation 40-Gbit/s optical transmission system, and also a transmission distance and frequency utilization efficiency similar to those of a 10-Gbit/s optical transmission system have been demanded. As an implementation means thereof, research and development of the DPSK (Differential Phase Shift Keying) modulation method, which is superior to the NRZ (Non return to Zero) modulation method conventionally applied to systems of 10 Gbit/s or below in optical signal to noise ratio (OSNR) strength and nonlinear strength, has been boosted. Further, in addition to the aforementioned modulation method, research and development of phase modulation methods such as the DQPSK (Differential Quadrature Phase-Shift Keying) modulation featuring narrow spectra (high frequency utilization efficiency) has also been boosted.

Particularly, the DQPSK modulation method is a method in which two phase-modulated digital signals are transmitted simultaneously using signal light of one frequency. This method requires only half pulse repetition frequencies (for example, 20 GHz) with respect to the speed of data to be transmitted (for example, 40 Gbit/s) and the spectral bandwidth will be half that of the conventional NRZ modulation method, and therefore is superior in frequency utilization efficiency, wavelength dispersion strength, and device transmission properties. Thus, in a field of optical transmission systems, particularly optical transmission systems whose data speed exceeds 40 Gbit/s, applications of this modulation method are actively explored.

FIG. 15 is a diagram showing a configuration example of a Mach-Zehnder (hereinafter simply called the MZ type) DQPSK modulator that adopts a conventional DQPSK modulation method. A similar DQPSK modulator is also described in Patent Document 1 shown below. A DQPSK modulator 100 shown in FIG. 15 is comprised of two child MZ type light modulators 101 and 102, a parent MZ type waveguide 103 comprised of the child MZ type light modulators 101 and 102, and a π/2 phase shifter 104.

That is, each of the child MZ type light modulators 101 and 102 comprises MZ type waveguides 101a and 102a, modulating electrodes 101b and 102b, and bias electrodes 101c and 102c adapted to supply a bias voltage to stabilize an operating point. Then, light output from an LD (Laser Diode) 105 is input into the child MZ type light modulators 101 and 102. Data signals (DATA1, DATA2) output from a DQPSK signal source 106, on the other hand, are amplified by drivers 107 and 108 of differential output and then input into the modulating electrodes 101b and 102b of the child MZ type light modulators 101 and 102 respectively. These data signals are thereby to be modulated in the child HZ type light modulators 101 and 102 by the data signals (DATA1, DATA2) from the DQPSK signal source 106 respectively.

The π/2 phase shifter 104 performs a phase shift of at least one of signals modulated by the child MZ type light modulators 101 and 102 so that the signals have a phase difference of π/2 with each other, and the parent MZ type waveguide 103 multiplexes signal lights from the child MZ type light modulators 101 and 102 whose phase shift has been performed by the π/2 phase shifter 104 so that the light can be output as a DQPSK modulated light.

In the child MZ type light modulator 101, for example, continuous light from the LD 105 (See A in FIG. 16) is modulated by one system of coding data (DATA1) from the DQPSK signal source 106 to output an optical signal carrying information in two optical phases (0 rad or π rad) (See B in FIG. 16). Further, in the child MZ type light modulator 102, continuous light from the LD 105 (See A in FIG. 16) is modulated by another system of coding data (DATA2) from the DQPSK signal source 106 and the phase of the modulated light is shifted by φ=π/2 by the π/2 phase shifter 104. An optical signal carrying information in two optical phases (π/2 rad or 3π/2 rad) is thereby output (See C in FIG. 16).

Then, the modulated lights from the child MZ type light modulators 101 and 102 are multiplexed by a multiplexing waveguide constituting the parent MZ type waveguide 103 before being output. That is, by multiplexing the modulated lights from the child MZ type light modulators 101 and 102, the parent MZ type waveguide 103 can output an optical signal carrying information in four optical phases (π/4, 3π/4, 5π/4, and 7π/4) with constant light intensity, that is, a DQPSK-modulated optical signal.

Meanwhile, Patent Document 1 describes a DQPSK modulator in which pilot frequency components are provided to a voltage signal supplied to the π/2 phase shifter 104 and the child MZ type light modulators 101 and 102 to monitor the pilot frequency components in output from the multiplexing waveguide constituting the parent MZ type waveguide 103 to perform feedback control.

[Patent Document 1] PCT International Publication No. WO 03/049333

In the DQPSK modulator shown in FIG. 15 or that described in Patent Document 1, it is necessary to make an electrode length of the modulating electrode 101b and that of the π/2 phase shifter 104 shorter to achieve lower losses and reduction in device size. Thus, in order to create a phase difference of π/2 between an optical signal output from the child MZ type light modulator 101 and that output from the child MS type light modulator 102 when viewed from the parent MZ type waveguide 103, there are problems that a required supply DC (Direct Current) bias value becomes larger and a supply part of a DC bias to the π/2 phase shifter 104 and a feedback control circuit for controlling the DC bias become large in size. There is also a problem that, in addition to components such as the child MZ type light modulators 101 and 102, the π/2 phase shifter 104 is needed, and therefore the chip configuration and module configuration of the modulator become complicated.

SUMMARY OF THE INVENTION

The present invention has been made in view of the above problems and an object thereof is to achieve miniaturization of a differential M (M=2$^n$: n is an integer equal to or greater than 2) phase-shift modulator.

Another object of the present invention is to achieve lower power consumption of the M phase-shift modulator.

A still another object of the present invention is to achieve simplification of a module configuration.

Aside from the above objects, effects that are derived from each configuration shown in preferred embodiments for carrying out the present invention described below and cannot be obtained from conventional techniques can also be regarded as another object.

(1) Thus, a differential M phase-shift modulator in the present invention is a differential M phase-shift modulator in which n (n is 2 or more) Mach-Zehnder type light modulators adapted to output a DPSK-modulated signal light by applying a driving voltage signal are arranged in parallel and that comprises a multiplexing waveguide adapted to output a DMPSK-modulated ($M=2^n$) light by multiplexing outputs of the n Mach-Zehnder type light modulators, wherein the n Mach-Zehnder type light modulators are adapted to be applied a phase-shift voltage to produce a phase shift difference of substantially $2\pi/M$ for the n signal lights multiplexed by the multiplexing waveguide together with the driving voltage signal.

(2) In this case, the differential M phase-shift modulator may be constructed so that the n is set to 2 and the M to 4, a first Mach-Zehnder type light modulator adapted to output a DPSK-modulated first signal light by applying a first driving voltage signal and a second Mach-Zehnder type light modulator adapted to output a DPSK-modulated second signal light by applying a second driving voltage signal are arranged in parallel, the multiplexing waveguide is adapted to output a DQPSK-modulated light by multiplexing outputs of the first and second Mach-Zehnder type light modulators, and at least one of the first and second Mach-Zehnder type light modulators are adapted to be applied a phase-shift voltage to produce a phase difference between the first signal light and second signal light of substantially $\pi/2$ together with the driving voltage signal.

(3) The aforementioned configuration in (2) may be such that the first Mach-Zehnder type light modulator comprises: a first Mach-Zehnder type optical waveguide, a first modulation electrode section adapted to apply the first driving voltage signal in the first Mach-Zehnder type optical waveguide, and a first bias electrode section adapted to supply a first bias control voltage for bias control during modulation based on the first driving voltage signal, and the second Mach-Zehnder type light modulator comprises: a second Mach-Zehnder type optical waveguide, a second modulation electrode section adapted to apply the second driving voltage signal in the second Mach-Zehnder type optical waveguide, and a second bias electrode section adapted to supply a second bias control voltage for bias control during modulation based on the first driving voltage signal.

(4) Further, the aforementioned configuration in (2) may be such that the first Mach-Zehnder type light modulator comprises: a first Mach-Zehnder type optical waveguide, and a first superimposed voltage electrode section adapted to supply a first superimposed voltage in which the first driving voltage signal and a first bias control voltage for bias control during modulation based on the first driving voltage signal are superimposed in the first Mach-Zehnder type optical waveguide, and the second Mach-Zehnder type light modulator comprises: a second Mach-Zehnder type optical waveguide, and a second superimposed voltage electrode section adapted to supply a second superimposed voltage in which the second driving voltage signal and a second bias control voltage for bias control during modulation based on the second driving voltage signal are superimposed in the second Mach-Zehnder type optical waveguide.

(5) The aforementioned configuration in (3) may be such that the phase-shift voltage is superimposed on the driving voltage signal corresponding to at least one of the first and second modulation electrode sections.

(6) The aforementioned configuration in (5) may further comprise a phase-shift voltage generating part adapted to generate the phase-shift voltage and a superimposing part adapted to couple the phase-shift voltage generated in the phase-shift voltage generating part to at least one of the first and second driving voltage signals.

(7) Further, the aforementioned configuration in (3) may be such that the phase-shift voltage is superimposed on the bias control voltage corresponding to at least one of the first and second bias electrode sections.

(8) The aforementioned configuration in (3) may further comprise a first driving voltage generating part adapted to generate the first driving voltage signal, a second driving voltage generating part adapted to generate the second driving voltage signal, a first bias control voltage generating part adapted to generate the first bias control voltage, and a second bias control voltage generating part adapted to generate the second bias control voltage.

(9) The aforementioned configuration in (4) may be such that a superimposed voltage obtained by further superimposing the phase-shift voltage is applied to at least one of the first and second superimposed voltage electrode sections.

(10) Further, the aforementioned configuration in (9) may further comprise a phase-shift voltage generating part adapted to generate the phase-shift voltage, and a superimposing part adapted to superimpose the phase-shift voltage generated in the phase-shift voltage generating part on at least one of the first and second superimposed voltages to be supplied to the first and second superimposed voltage electrode sections respectively.

(11) The aforementioned configuration in (4) may further comprise a first driving voltage generating part adapted to generate the first driving voltage signal, a second driving voltage generating part adapted to generate the second driving voltage signal, a first bias control voltage generating part adapted to generate the first bias control voltage, a second bias control voltage generating part adapted to generate the second bias control voltage, a first voltage superimposing part adapted to superimpose the first driving voltage signal generated in the first driving voltage generating part and the first bias control voltage generated in the first bias control voltage generating part to apply the obtained voltage to the first superimposed voltage electrode section as the first superimposed voltage, and a second voltage superimposing part adapted to superimpose the second driving voltage signal generated in the second driving voltage generating part and the second bias control voltage generated in the second bias control voltage generating part to apply the obtained voltage to the second superimposed voltage electrode section as the second superimposed voltage, wherein at least one of the first and second voltage superimposing parts further superimposes the phase-shift voltage generated in the phase-shift voltage generating part.

(12) Further, the aforementioned configuration in (2) may be such that the first and second Mach-Zehnder type light modulators have each a Mach-Zehnder type waveguide having two arm waveguides and also two electrodes adapted to apply an electric field to the two arm waveguides each, wherein the phase-shift voltage is supplied to the both electrodes in at least one of the first and second Mach-Zehnder type light modulators.

(13) The aforementioned configuration in (12) may further comprise an application ratio setting part adapted to set an application ratio of the phase-shift voltage supplied to two electrodes in each of the first and second Mach-Zehnder type light modulators.

(14) Further, the aforementioned configuration in (2) may further comprise a demultiplexing waveguide adapted to demultiplex input light into two to output each to the first Mach-Zehnder type light modulator and second Mach-Zehnder type light modulator.

According to the present invention, as described above, a phase-shift voltage to produce a phase shift difference of substantially $2\pi/4$ (M) for the n signal lights multiplexed by the multiplexing waveguide can be applied to the two (n) Mach-Zehnder type light modulators together with the driving voltage signal, and therefore a function corresponding to a $\pi/2$ phase shifter in a conventional technique can be added to the two (n) Mach-Zehnder type light modulators and a waveguide space reserved for mounting the $\pi/2$ phase shifter can be left out, achieving reduction in device size. In addition, by selecting the waveguide space reserved for mounting the $\pi/2$ phase shifter as a formation area of the two (n) Mach-Zehnder type light modulators, electrode lengths can be increased while maintaining the existing device size, and therefore power consumption can advantageously be reduced by towering the voltage applied to the electrodes.

BRIEF DESCRIPTION OF THE DRAWINGS

FIG. 16 is a diagram illustrating the DQPSK modulation method.

DESCRIPTION OF THE PREFERRED EMBODIMENTS

Embodiments of the present invention will be described below with reference to drawings.

The present invention can be carried out in various modifications without deviating from the scope of the present invention regardless of each embodiment shown below. In addition to objects of the present invention described above, other technical problems, means for solving such technical problems, and working effects will be apparent from disclosures of the embodiments shown below.

[A] Description of the First Embodiment

Figure 1:
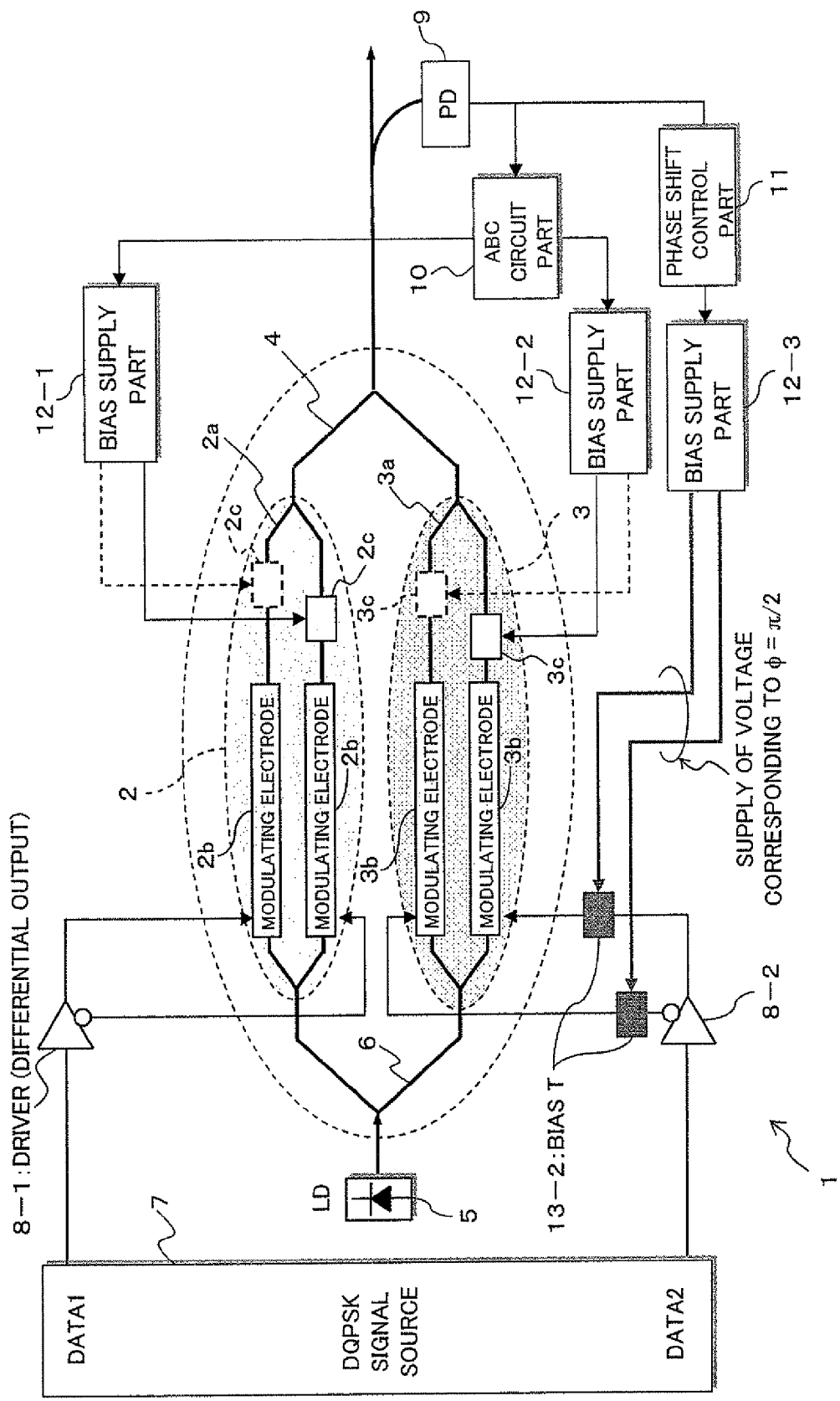
FIG. 1 is a diagram showing a DQPSK modulator according to a first embodiment of the present invention.

FIG. 1 is a diagram showing a DQPSK modulator 1 according to the first embodiment of the present invention. The DQPSK modulator 1 shown in FIG. 1 comprises a first MZ type light modulator 2, a second MZ type light modulator 3, and a multiplexing waveguide 4, and together with these components, the DQPSK modulator 1 can also be constructed by including a light source 5 composed of LD, a demultiplexing waveguide 6, a DQPSK signal source 7, drivers 8-1 and 8-2, a photo diode (PD) 9, an ABC (Automatic Bias Control) circuit part 10, a phase shift control part 11, bias supply parts 12-1 to 12-3, and a bias-T 13-2.

Here, the DQPSK signal source 7 generates original data (DATA1 and DATA2) for modulation as a DQPSK signal light, and the drivers 8-1 and 8-2 amplify electric signals based on (pre-code processed) first data and second data (DATA1, DATA2) from the DQPSK signal source 7 to supply the electric signals to the first MZ type light modulator 2 and second MZ type light modulator 3 as first and second driving electric signals respectively.

Therefore, a first driving voltage generating part that generates a first driving voltage signal is constituted by the aforementioned DQPSK signal source 7 and driver 8-1, and a second driving voltage generating part that generates a second driving voltage signal is constituted by the DQPSK signal source 7 and driver 8-2. The configuration and operations of the aforementioned DQPSK signal source 7 are described, for example, in PCT National Publication No. 2004-516743.

The demultiplexing waveguide 6 demultiplexes light from the light source 5 into two, and the first MZ type light modulator 2 can output a first signal light obtained by DPSK-modulating light from the demultiplexing waveguide 6 after applying the first driving voltage signal from the driver 8-1 and has bias electrodes 2c together with a first HZ type optical waveguide 2a to which one output of the demultiplexing waveguide 6 is connected and modulating electrodes 2b adapted to apply the first driving voltage signal. Therefore, the modulating electrodes 2b are a first modulation electrode section adapted to apply the first driving voltage signal in the first HZ type optical waveguide 2a and the bias electrodes 2c are a first bias electrode section adapted to supply a first bias control voltage for bias control when the first driving voltage signal is used for modulation.

Similarly, the second MZ type light modulator 3 outputs a second signal light obtained by DPSK-modulating light from the demultiplexing waveguide 6 after applying the second driving voltage signal from the driver 8-2 and has bias electrodes 3c together with a second MZ type optical waveguide 3a to which another output of the demultiplexing waveguide 6 is connected and modulating electrodes 3b adapted to apply the second driving voltage signal. Therefore, the modulating electrodes 3b are a second modulation electrode section adapted to apply the second driving voltage signal in the second MZ type optical waveguide 3a and the bias electrodes 3c are a second bias electrode section adapted to supply a second bias control voltage for bias control when the second driving voltage signal is used for modulation.

Further, the multiplexing waveguide 4 multiplexes outputs of the first MZ type light modulator 2 and second MZ type light modulator 3, that is, the first and second signal lights DPSK-modulated by the first MZ type light modulator 2 and second MZ type light modulator 3 respectively, and a DQPSK (Differential Quadrature Phase-Shift Keying)-modulated signal light can be output through the multiplexing waveguide 4. At least the aforementioned demultiplexing waveguide 6, first MZ type light modulator 2, second MZ type light modulator 3, and multiplexing waveguide 4 can integrally be formed on the same substrate when appropriate.

The PD 9 monitors power of the DQPSK-modulated signal light output from the multiplexing waveguide 4, and monitoring results are output to the ABC circuit part 10 and the phase shift control part 11. Based on the monitoring results from the PD 9, the ABC circuit part 10 performs feedback control of the bias voltage supplied to the bias electrodes 2c and 3c through the bias supply parts 12-1 and 12-2.

More specifically, the ABC circuit part 10 performs feedback control of the bias voltage supplied to the bias electrodes 2c and 3c constituting the first MZ type light modulator 2 and second MZ type light modulator 3 through the bias supply parts 12-1 and 12-2 respectively so that each of the signal lights DPSK-modulated by the first MZ type light modulator 2 and second MZ type light modulator 3 can carry information in one of two phase points (so that operating points are stabilized) having a proper phase difference (π phase in this case).

Meanwhile, a technique described in Japanese Patent Application Laid-Open No. HEI 3-251815 or that described in Japanese Patent Application Laid-Open No. 2000-162563 can be applied as a technique to stabilize operating points of the first MZ type light modulator 2 and second MZ type light modulator 3 by the ABC circuit part 10 described above.

Further, the phase shift control part 11 controls the bias supply part 12-3 to supply the bias voltage for shifting the phase to at least one of the first MZ type light modulator 2 and second MZ type light modulator 3 (in this case, the second MZ type light modulator 3) so that, based on the monitoring results from the PD 9, the signal lights DPSK-modulated by the first MZ type light modulator 2 and second MZ type light modulator 3 have a relatively proper phase difference (in this case, the π/2 phase) (See C in FIG. 16).

Meanwhile, in the first embodiment, the bias supply part 12-3 supplies the bias voltage for phase shift to the modulating electrodes 3b of the second MZ type light modulator 3 via the bias-T 13-2, and the aforementioned bias voltage can thereby be supplied to the modulating electrodes 3b formed on each of two arms constituting the second MZ type optical waveguide 3a and thus equivalent phase shifts can be provided to signal lights being propagated through both arms of the second MZ type light modulator 3.

The bias supply part 12-1 supplies the bias voltage to the bias electrodes 2c so that, under control of the ABC circuit part 10, signal light modulated by the first MZ type light modulator 2 carries information in two phase points having a proper phase difference, that is, having a phase difference of π (0, π) (See B in FIG. 16). Meanwhile, the bias supply part 12-1 may supply the bias voltage through both bias electrodes 2c on two arm waveguides constituting the first MZ type light modulator 2 or through one bias electrode 2c.

Similarly, the bias supply part 12-2 supplies the bias voltage to the bias electrodes 2c so that, under control of the ABC circuit part 10, signal light modulated by the second MZ type light modulator 3 carries information in two phase points (π/2, 3π/2) having a phase difference of π (See C in FIG. 16). Meanwhile, the bias supply part 12-2 may also supply the bias voltage through both bias electrodes 3c on two modulation waveguides constituting the second MZ type light modulator 3 or through one bias electrode 3c.

Therefore, the aforementioned ABC circuit part 10 and the bias supply part 12-1 constitute a first bias control voltage generating part adapted to generate a first bias control voltage for bias control (for stabilization of operating points) when a first driving voltage signal is used for modulation. Likewise, the aforementioned ABC circuit part 10 and the bias supply part 12-2 constitute a second bias control voltage generating part adapted to generate a second bias control voltage for bias control (for stabilization of operating points) when a second driving voltage signal is used for modulation.

Further, the bias supply part 12-3 outputs the bias voltage to the second MZ type light modulator 3 to shift the phase by π/2 so that, under control of the phase shift control part 11, signal lights DPSK-modulated by the first MZ type light modulator 2 and second MZ type light modulator 3 have a relatively proper phase difference of π/2. Then, the bias-T 13-2 superimposes the bias voltage for phase shift from the bias supply part 12-3 on the second driving signal differentially output from the driver 8-2 to be supplied to the modulating electrodes 3b.

The phase shift control part 11 can stabilize the bias voltage at an optimal control point by dithering and, the aforementioned bias-T 13-2 can superimpose the bias voltage containing low-frequency components for dithering also on the second driving voltage signal (having modulated signal components) from the driver 8-2.

The phase shift control part 11 can, for example, apply the bias voltage after, for example, low-frequency signals are superimposed by the bias supply part 12-3 to stabilize the bias voltage for phase shift, and also perform feedback control of the bias voltage for phase shift through the bias supply part 12-3 so that applied low-frequency signal components excluding harmonic content contained in monitoring signals output from the PD 9 become maximum. A similar technique is described in a specification initially attached to a patent application (Japanese Patent Application Laid-Open No. 2005-192971) submitted by the present applicant.

Therefore, the aforementioned PD 9, the phase shift control part 11, and the bias supply part 12-3 constitute a phase-shift voltage generating part adapted to generate a phase-shift voltage so that two signal lights multiplexed by the multiplexing waveguide 4 have a phase shift difference of substantially π/2, and the bias-T 13-2 constitutes a superimposing part that couples a phase-shift voltage generated by the bias supply part 12-3 to at least one of the first and second driving voltage signals.

Next, a concrete signal flow in the DQPSK modulator 1 constructed as described above will be described. The data signal (DATA1) output from the DQPSK signal source 7 is amplified by the driver 8-1 of differential output and then input into the modulating electrode 2b of the first MZ type light modulator 2 unchanged as a first driving electric signal. The data signal (DATA2) output from the DQPSK signal source 7, on the other hand, is amplified by the driver 8-2 of differential output (second driving electric signal) and then, after adding a DC bias for π/2 phase shift through the bias-T 13-2, input into the modulating electrode 3b of the second MZ type light modulator 3.

An optical signal output from the light source 5 passes through the first and second MZ type light modulators 2 and 3 and the multiplexing waveguide 4. At this point, the optical signal is phase-modulated by data signals (first and second driving electric signals) output from the drivers 8-1 and 8-2. The DC bias feedback-controlled by the ABC circuit part 10 is supplied to the bias electrodes 2c and 3c of the first and second MZ type light modulators 2 and 3 through the bias supply part 12-1 and 12-2 to stabilize operating points of the first and second MZ type light modulators 2 and 3 respectively.

Further, the DC bias feedback-controlled by the phase shift control part 11 is supplied via the bias supply part 12-3 and the bias-T 13-2 to the modulating electrodes 3b of one of the first and second MZ type light modulators 2 and 3, for example, of the second MZ type light modulator 3 so that the phase difference of an optical signal output from the first MZ type light modulator 2 and that output from the second MZ type light modulator 3 when viewed from the multiplexing waveguide 4 becomes π/2 with stability.

Figure 2:
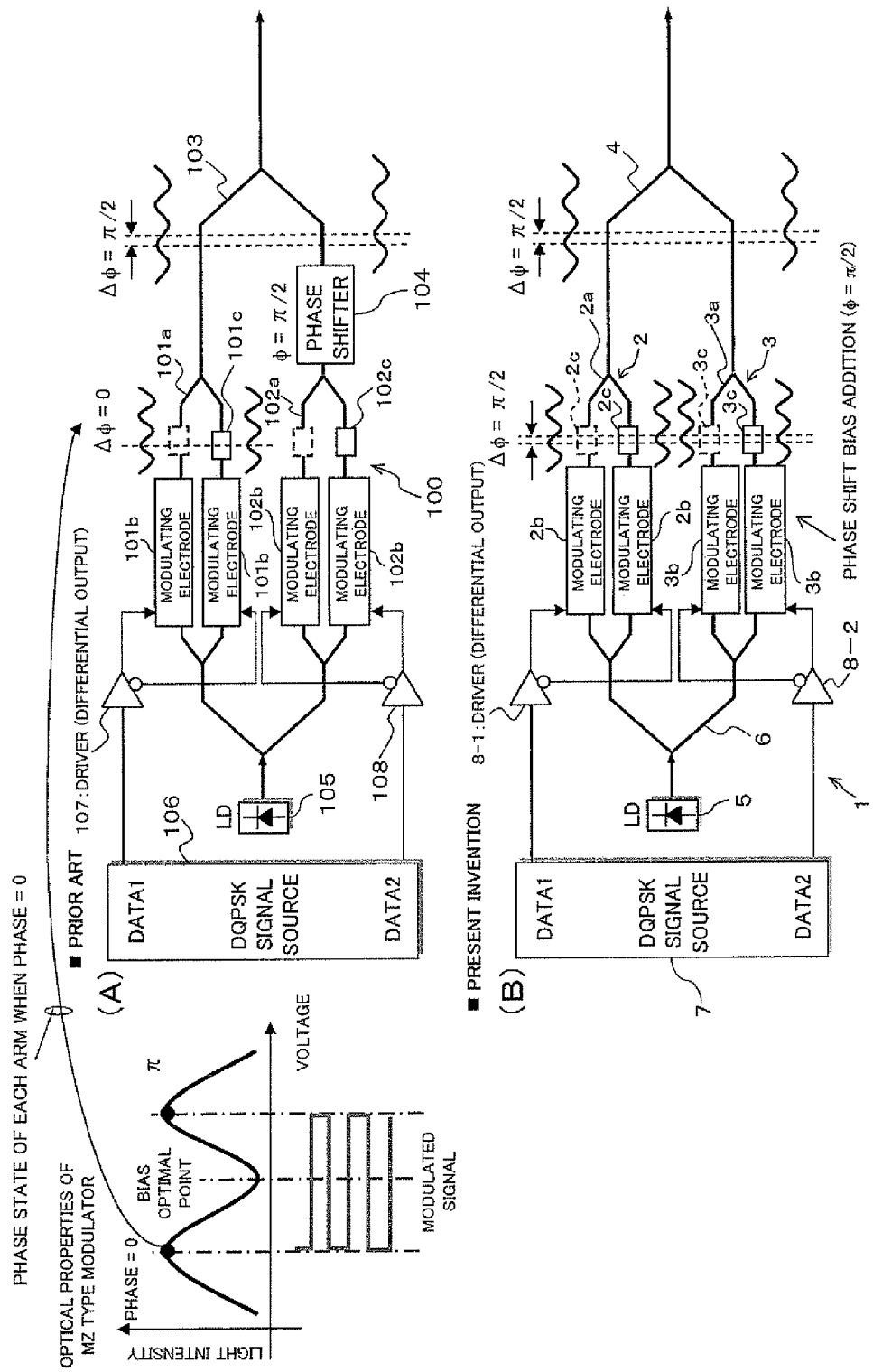
FIG. 2 is a diagram illustrating working effects of the DQPSK modulator according to the first embodiment of the present invention.

Accordingly, while in the DQPSK modulator 100 of a conventional technique, as shown in, for example, (A) of FIG. 2, no phase shift is carried out in a stage when a signal light is propagated through the child MZ type light modulators 101 (the phase state in each arm is φ=0), but a phase shift (φ=π/2) is carried out by the π/2 phase shifter 104 provided in the parent MZ type waveguide 103 in a latter part, a phase shift is carried out in the first embodiment, as shown in (B) in FIG. 2, in the stage when a signal light is propagated through the first and second MZ type light modulators 2 and 3 (the phase state in each arm is $\phi=\pi/2$), eliminating a need for providing the $\pi/2$ phase shifter 104 as (A) in FIG. 2.

Figure 3:
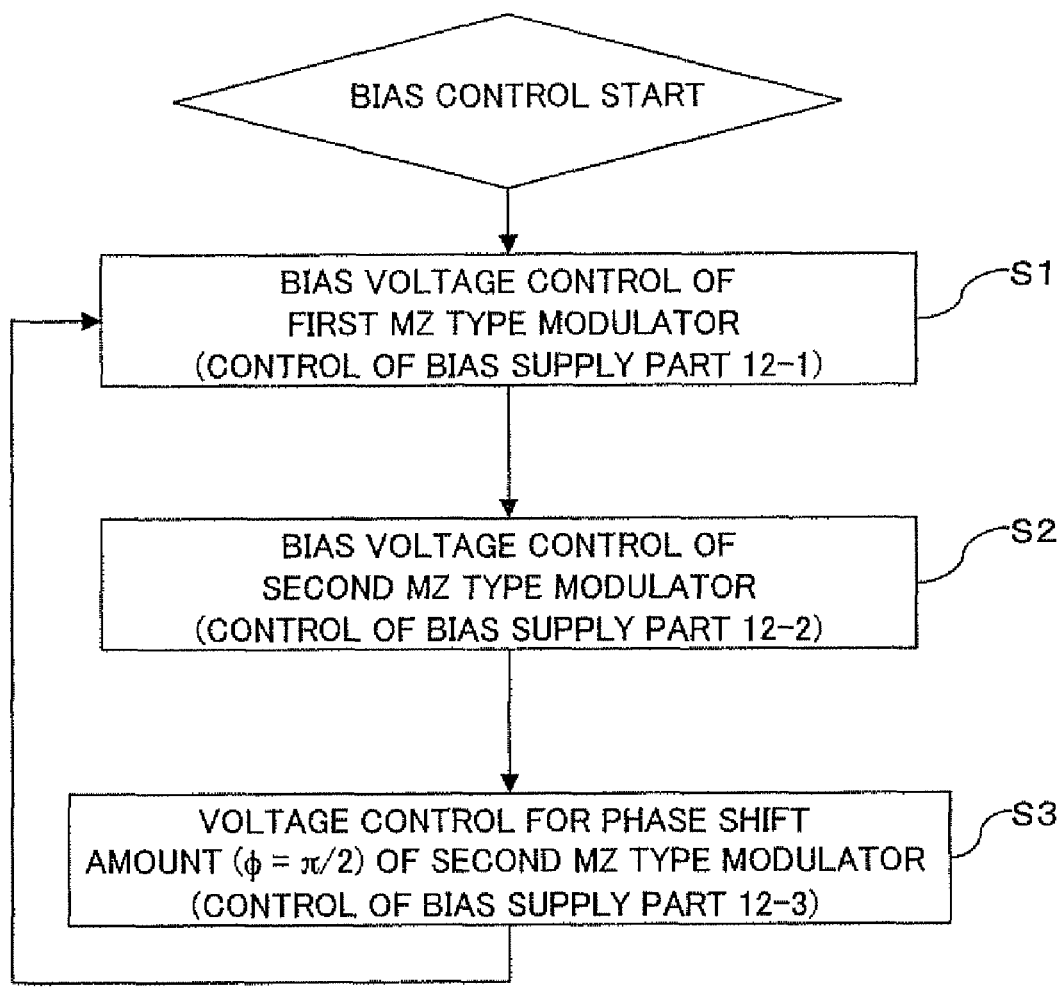
FIG. 3 is a flow chart illustrating a control sequence of the DQPSK modulator according to the first embodiment of the present invention.

The DQPSK modulator 1 according to the first embodiment is provided with three bias supply parts 12-1 to 12-3, and FIG. 3 exemplifies an algorithm of device control thereof. After starting device control, as shown in FIG. 3, first feedback control of the bias supply part 12-1 and bias supply part 12-2 to supply a bias voltage for determining an operating point of the first MZ type light modulator 2 or second MZ type light modulator 3 is performed by the ABC circuit part 10 (steps S1 and S2). In this case, the order of control of the bias voltage for the first MZ type light modulator 2 and second MZ type light modulator 3 can be reversed.

Then, the bias voltage is simultaneously supplied to the two modulating electrodes 3b of the second MZ type light modulator 3 so that the phase difference of an optical signal output from the first MZ type light modulator 2 and that output from the second MZ type light modulator 3 when viewed from the multiplexing waveguide 4 becomes $\pi/2$ with stability through control of the bias supply part 12-3 by the phase shift control part 11 (step S3). The bias voltage supplied from the bias supply parts 12-1 to 12-3 can be stabilized by repeating the above-described control (steps S1 to S3) so that quality of DQPSK modulated signals can be maintained.

Figure 15:
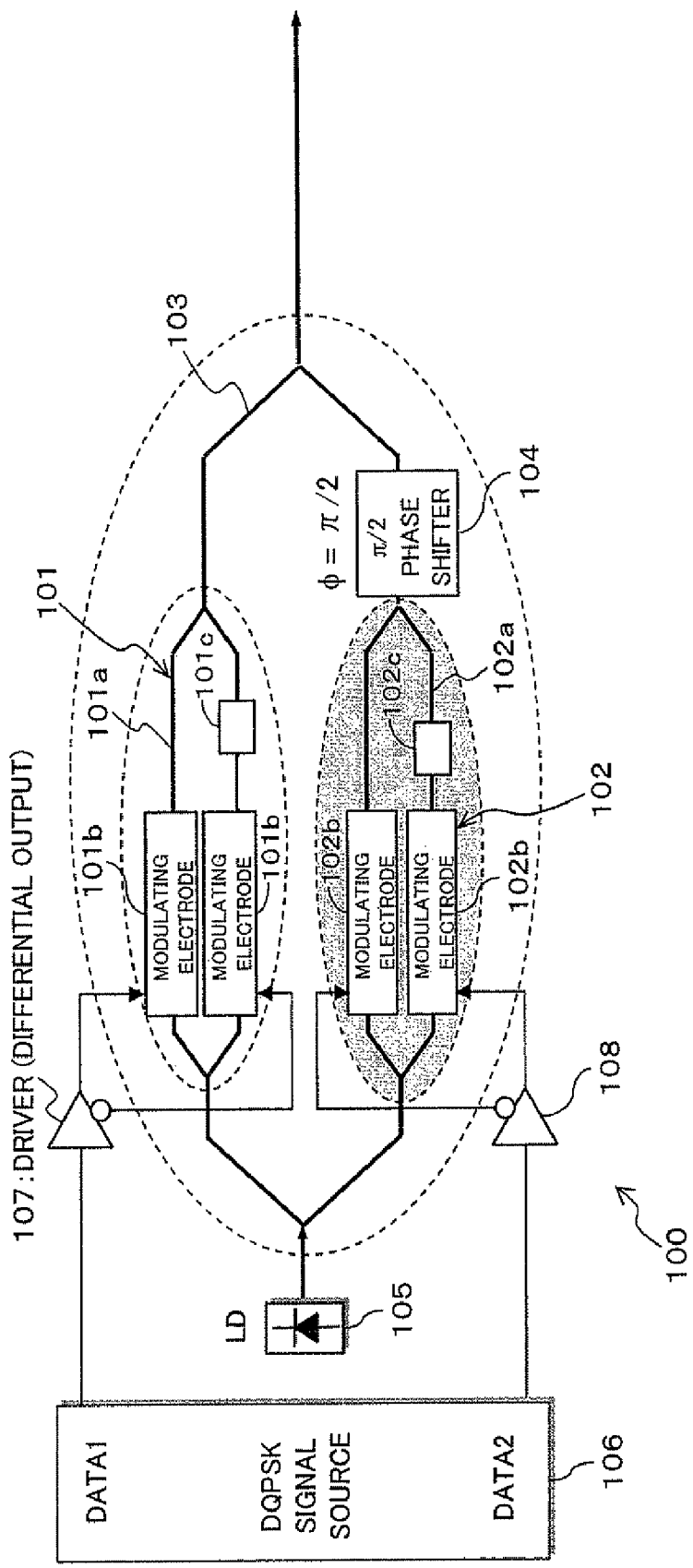
FIG. 15 is a diagram showing a configuration example of a Mach-Zehnder type DQPSK modulator that adopts a conventional DQPSK modulation method.

According to the DQPSK modulator 1 in the first embodiment, as described above, a function corresponding to that of the $\pi/2$ phase shifter 104 provided in the parent MZ type waveguide 103 can be added to the modulating electrodes 3b when compared with FIG. 15 shown above, and therefore a waveguide space reserved for mounting then $\pi/2$ phase shifter 104 can now be left out. Therefore, in addition to being able to reduce the device size, by selecting the waveguide space reserved for mounting the $\pi/2$ phase shifter 104 as a formation area of the first and second MZ type light modulators 2 and 3, electrode lengths required for the modulating electrodes 2b and 3b and bias electrodes 2c and 3c can be increased while maintaining the existing device size, advantageously reducing power consumption.

A bias voltage for phase shift is supplied to the modulating electrodes 3b of the second MZ type light modulator 3 in the first embodiment, but the bias voltage may also be supplied to the modulating electrodes 2b of the first MZ type light modulator 2 by setting up a bias T between the driver 8-1 and modulating electrodes 2b when necessary or to the modulating electrodes 2b and 3b of both the first and second MZ type light modulators 2 and 3. When a bias voltage is supplied to the modulating electrodes 2b and 3b of both the first and second MZ type light modulators 2 and 3, bias voltages must be set at least in such way that a phase shift amount due to a bias voltage supplied to the modulating electrodes 2b and that due to the bias voltage supplied to the modulating electrodes 3b substantially have a phase difference of $\pi/2$.

[A1] Description of a First Modification of the First Embodiment

Figure 4:
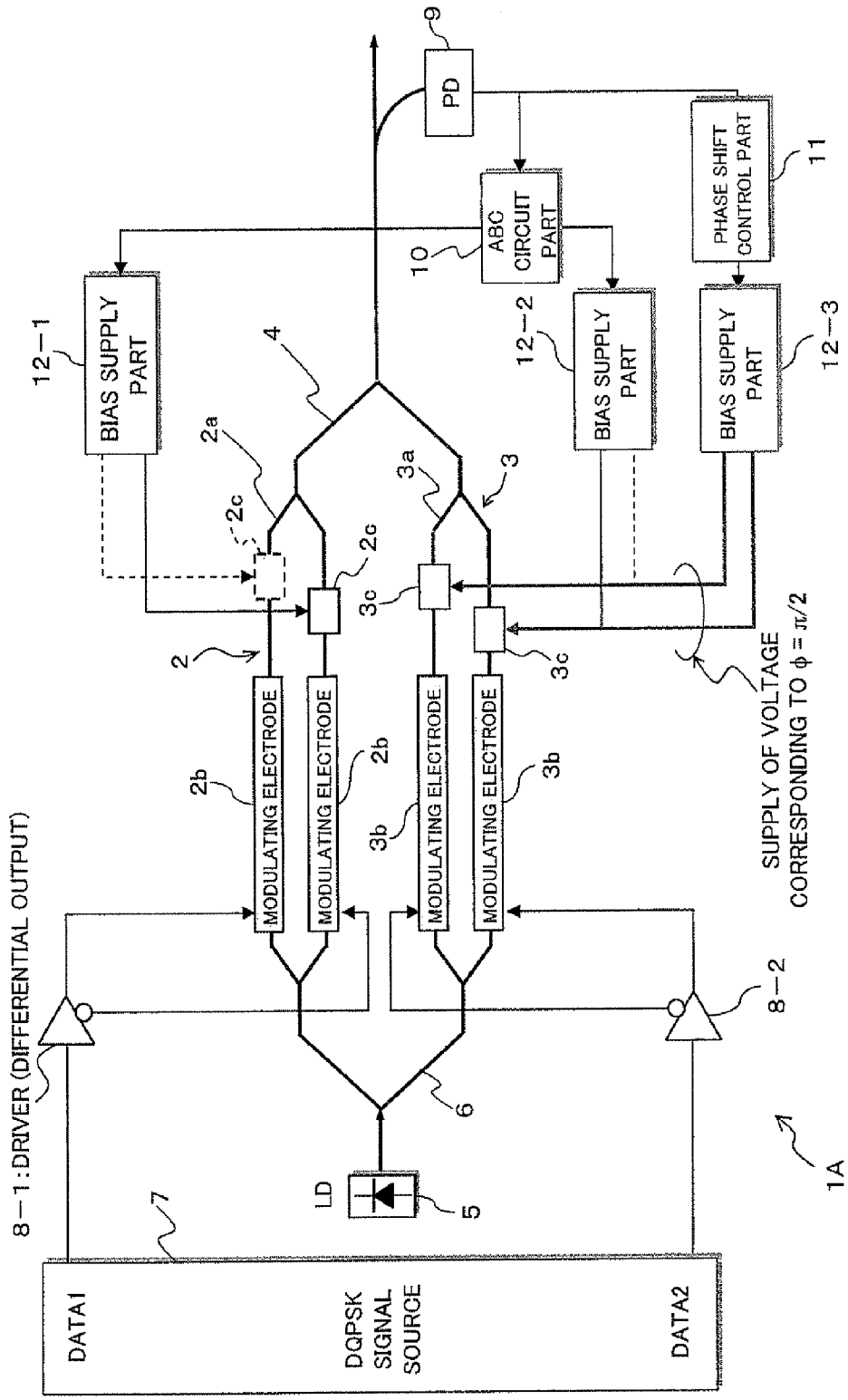
FIG. 4 to FIG. 7 are each diagrams showing modifications of the DQPSK modulator according to the first embodiment of the present invention.

FIG. 4 is a diagram showing a DQPSK modulator 1A according to a first modification of the first embodiment of the present invention. The DQPSK modulator 1A shown in FIG. 4 is different from the aforementioned DQPSK modulator 1 shown in FIG. 1 (See numeral 1) in that the bias voltage for phase shift from the bias supply part 12-3 is supplied via the bias electrodes 3c, instead of the modulating electrodes 3b of the second MZ type light modulators 3, but otherwise, the configuration is basically the same as that shown in FIG. 1. The same numerals in FIG. 4 as those in FIG. 1 denote approximately the same components.

That is, in the DQPSK modulator 1A shown in FIG. 4, the bias electrode 3c is formed on both arms constituting the second MZ type optical waveguide 3a and a bias voltage under control of the phase shift control part 11 is applied to these bias electrodes 3c via the bias supply part 12-3. Like the aforementioned DQPSK modulator 1 shown in FIG. 1, the bias voltage from the bias supply part 12-2 under control of the ABC circuit part 10 is also applied to the bias electrodes 3c, but this bias voltage may be applied to the bias electrodes 3c of both arms or one of the bias electrodes 3c.

In the DQPSK modulator 1A constructed as described above, a function corresponding to that of the $\pi/2$ phase shifter 104 (See FIG. 15) can be added to the bias electrodes 3c, and therefore, like the DQPSK modulator 1 shown in FIG. 1, a waveguide space reserved for mounting the $\pi/2$ phase shifter 104 can now be left out to achieve reduction in device size. By selecting the waveguide space reserved for mounting the $\pi/2$ phase shifter 104 as a formation area of the first and second MZ type light modulators 2 and 3, electrode lengths required for the modulating electrodes 2b and 3b and bias electrodes 2c and 3c can be increased while maintaining the existing device size, advantageously reducing power consumption.

[A2] Description of a Second Modification of the First Embodiment

Figure 5:
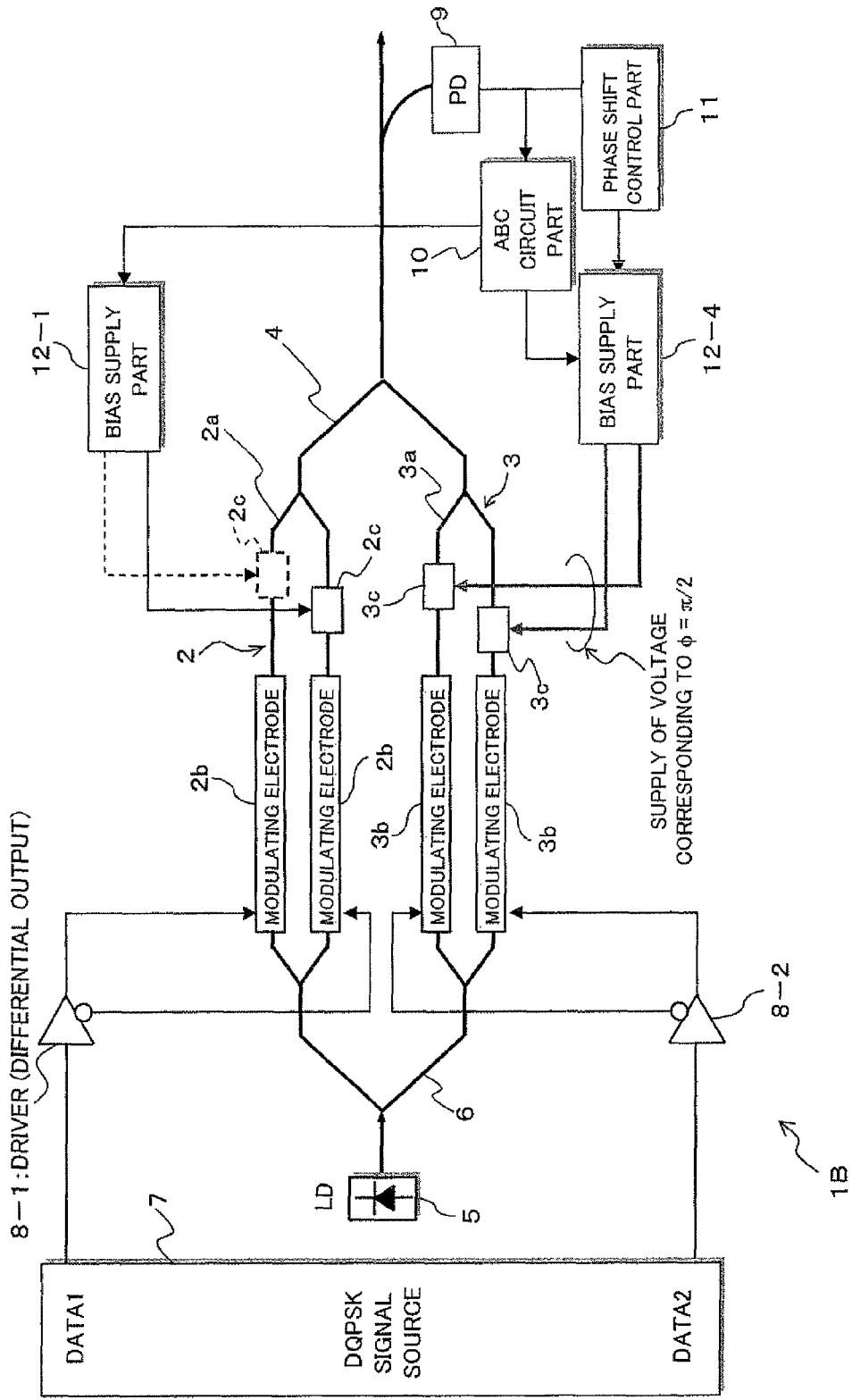

FIG. 5 is a diagram showing a DQPSK modulator 1B according to a second modification of the first embodiment of the present invention. The DQPSK modulator 1B shown in FIG. 5 has a bias supply part 12-4 that makes a function of the bias supply part 12-2 and that of the bias supply part 12-3 shareable and is different from the DQPSK modulator 1A shown in FIG. 4 in this respect. Otherwise, the configuration is basically the same as that of the DQPSK modulator 1A shown in FIG. 4 and the same numerals in FIG. 5 as those in FIG. 4 denote approximately the same components. Also with the DQPSK modulator 1B constructed as described above, a function corresponding to that of the $\pi/2$ phase shifter 104 (See FIG. 15) can be added to the bias electrodes 3c, and therefore advantages similar to those of the DQPSK modulator 1 shown in FIG. 1 can be obtained.

[A3] Description of a Third Modification of the First Embodiment

Figure 6:
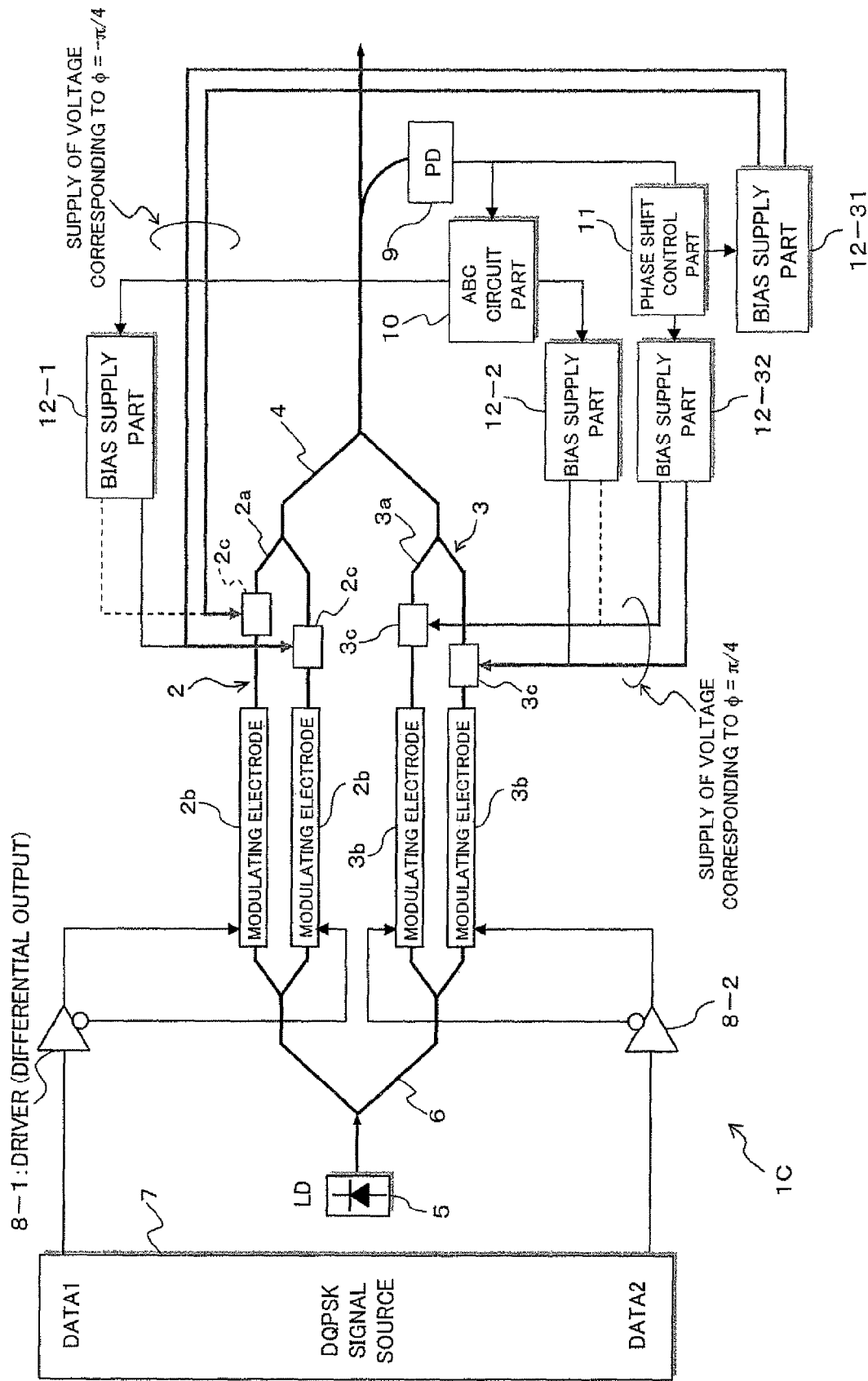

FIG. 6 is a diagram showing a DQPSK modulator 1C according to a third modification of the first embodiment of the present invention. The DQPSK modulator 1C shown in FIG. 6 has, instead of the aforementioned bias supply part 12-3 shown in FIG. 4, bias supply parts 12-31 and 12-32 to supply a bias voltage for phase shift to the first and second MZ type light modulators 2 and 3 respectively under control of the phase shift control part 11 and is different from the DQPSK modulator 1A shown in FIG. 4 in this respect. Otherwise, the configuration is basically the same as that of the DQPSK modulator 1A shown in FIG. 4 and the same numerals in FIG. 6 as those in FIG. 4 denote approximately the same components.

That is, in the first MZ type light modulator 2 of the DQPSK modulator 1C shown in FIG. 6, the bias electrode 2c is formed on both arms constituting the first MZ type optical waveguide 2a and the bias electrode 3c is formed on both arms constituting the second MZ type optical waveguide 3a.

Then, the bias supply part 12-31 applies a bias voltage for phase shift to the bias electrodes 2c on both arms constituting the first MZ type optical waveguide 2a under control of the phase shift control part 11 and the bias supply part 12-32 applies a bias voltage for phase shift to the bias electrodes 3c on both arms constituting the second MZ type optical waveguide 3a under control of the phase shift control part 11.

Here, the bias voltage supplied to the bias electrodes 2c and 3c by the bias supply parts 12-31 and 12-32 respectively is set in such a way that two signal lights output from the first and second MZ type light modulators 2 and 3 to be multiplexed by the multiplexing waveguide 4 have a relative phase difference of $\pi/2$.

As shown in FIG. 6, for example, the bias supply part 12-31 supplies a bias voltage so that a phase shift amount $\phi 1$ of signal light output from the multiplexing waveguide 4 through the first MZ type light modulator 2 becomes $\phi 1 = -\pi/4$ and the bias supply part 12-32 supplies a bias voltage so that a phase shift amount $\phi 2$ of signal light output from the multiplexing waveguide 4 through the second MZ type light modulator 3 becomes $\phi 2 = \pi/4$. In this way, a relative phase difference of two signal lights output from the multiplexing waveguide 4 through the first and second MZ type light modulators 2 and 3 can be $\pi/2$.

According to the present invention, the bias voltage supplied by the bias supply part 12-31 and that supplied by the bias supply part 12-32 are such that the phase shift amounts become $\phi 1 = -\pi/4$ and $\phi 2 = \pi/4$, but as long as a relative phase difference of $\pi/2$ is obtained, other bias voltages supplied by each of the bias supply parts 12-31 and 12-32 may be set to obtain other phase shift amounts.

Also with the DQPSK modulator 1C constructed as described above, a function corresponding to that of the $\pi/2$ phase shifter 104 (See FIG. 15) can be added to the bias electrodes 2c and 3c, and therefore advantages similar to those of the DQPSK modulator 1 shown in FIG. 1 can be obtained, and the bias voltage required for phase shift can be divided among a plurality of the electrodes 2c and 3c of the MZ type light modulators 2 and 3, further contributing to reduction in power consumption.

[A4] Description of a Fourth Modification of the First Embodiment

Figure 7:
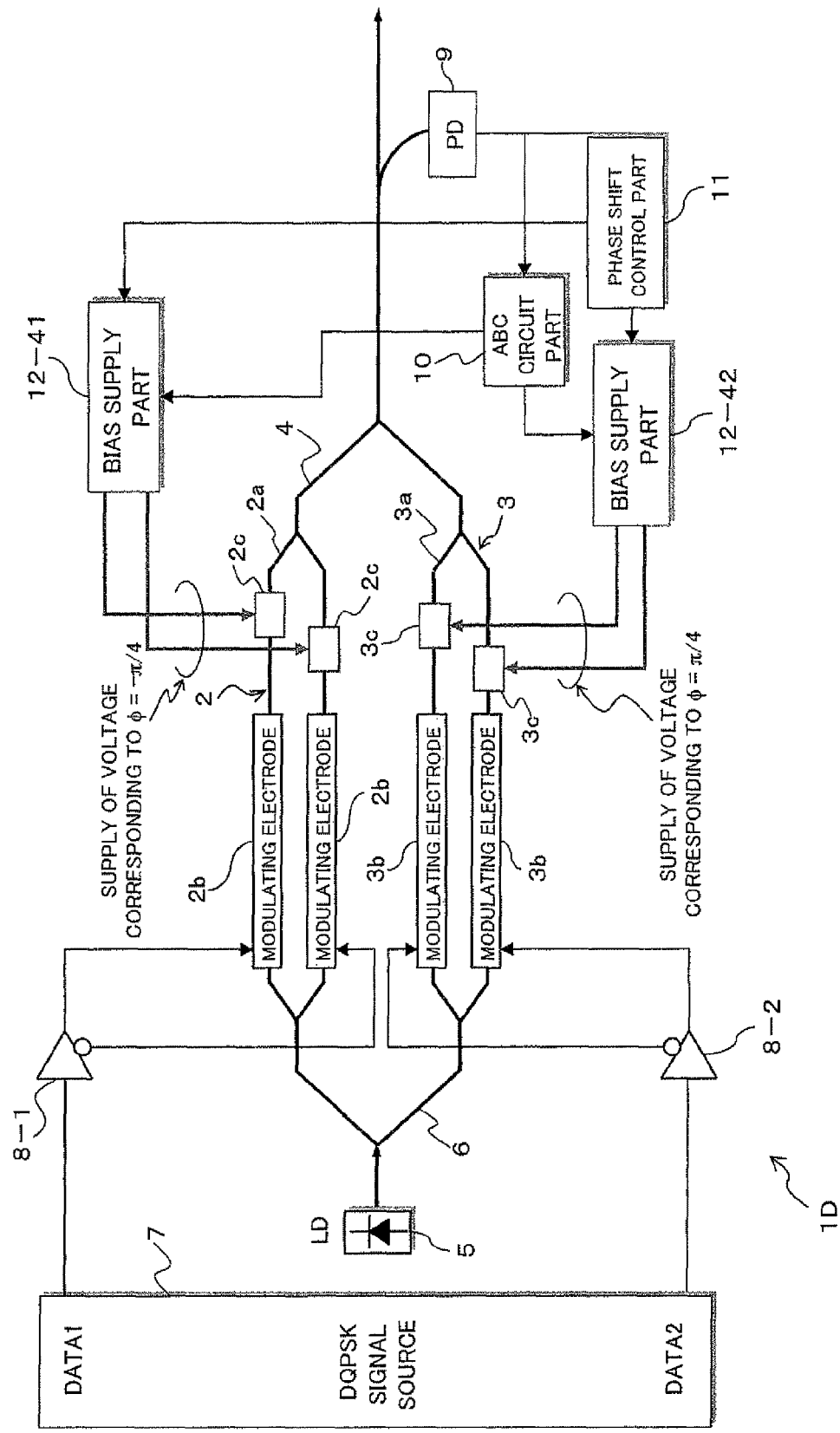

FIG. 7 is a diagram showing a DQPSK modulator 1D according to a fourth modification of the first embodiment of the present invention. The DQPSK modulator 1D shown in FIG. 7 has a bias supply part 12-41 that makes a function of the bias supply part 12-1 and that of the bias supply part 12-31 shareable and a bias supply part 12-42 that makes a function of the bias supply part 12-2 and that of the bias supply part 12-32 shareable, and is different from the DQPSK modulator 1C shown in FIG. 6 in this respect. Otherwise, the configuration is basically the same as that of the DQPSK modulator 1C shown in FIG. 6 and the same numerals in FIG. 7 as those in FIG. 6 denote approximately the same components. Also with the DQPSK modulator ID constructed as described above, a function corresponding to that of the $\pi/2$ phase shifter 104 (See FIG. 15) can be added to the bias electrodes 2c and 3c, and therefore advantages similar to those of the DQPSK modulator 1 shown in FIG. 1 can be obtained.

[B] Description of the Second Embodiment

Figure 8:
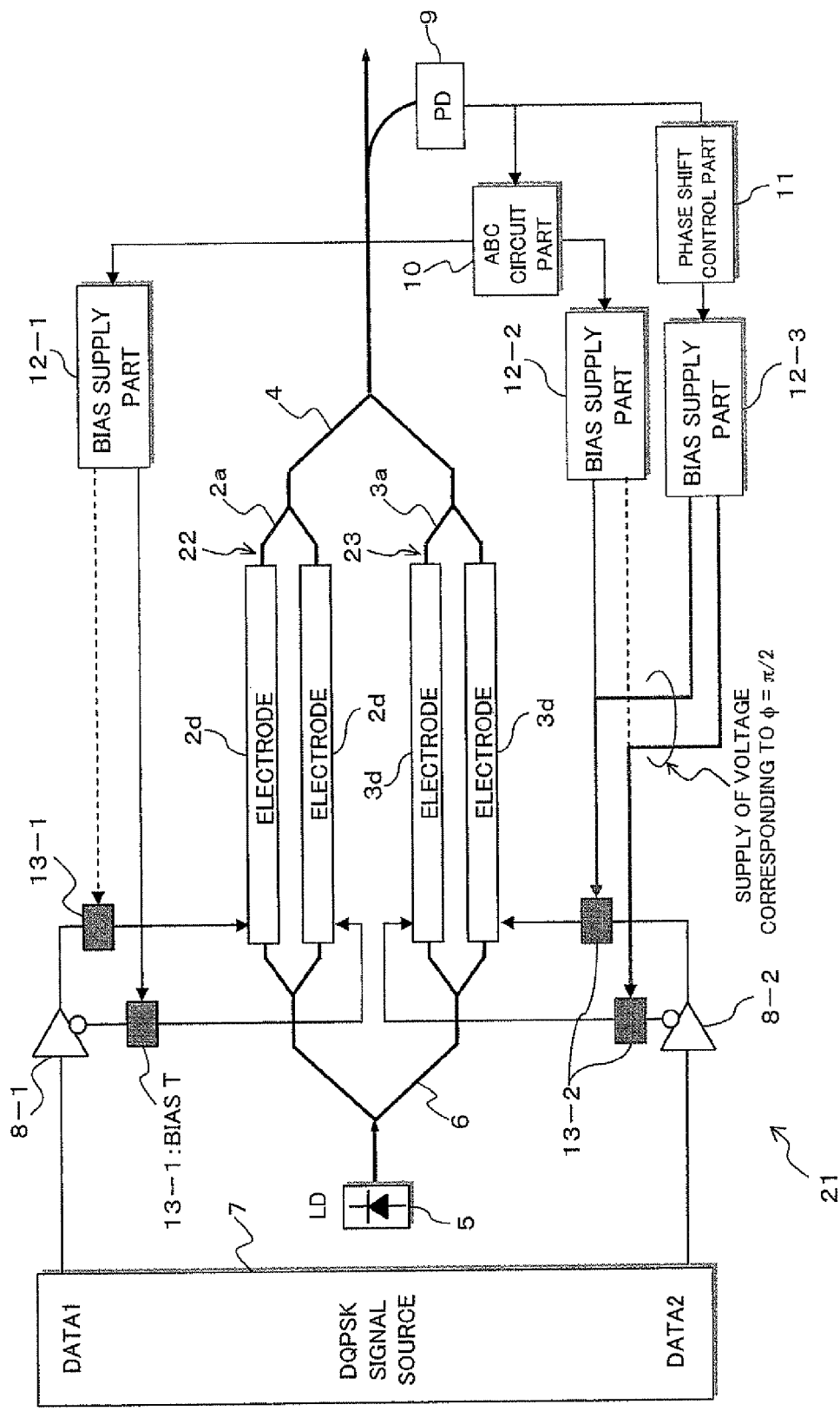
FIG. 8 is a diagram showing a DQPSK modulator according to a second embodiment of the present invention.

FIG. 8 is a diagram showing a DQPSK modulator 21 according to a second embodiment of the present invention. The DQPSK modulator 21 shown in FIG. 8 is different from the DQPSK modulator 1 in the aforementioned first embodiment in a supply mode of the bias voltage to each of first and second MZ type light modulators 22 and 23 along with the configuration of each of the first and second MZ type light modulators 22 and 23 (See numerals 1 and 2 in FIG. 1). Otherwise, the configuration is basically the same as that of the DQPSK modulator 1 shown in FIG. 1 and the same numerals in FIG. 8 as those in FIG. 1 denote approximately the same components.

Here, the first and second MZ type light modulators 22 and 23 have the first and second MZ type optical waveguides 2a and 3a like the aforementioned first embodiment and also electrodes 2d and 3d for modulation/bias shared use respectively.

The electrode 2d is formed on both arms constituting the first MZ type optical waveguide 2a and the bias voltage from the bias supply part 12-1 is supplied via the bias-T 13-1 on top of others along with the first driving voltage signal from the driver 8-1. Also, the electrode 3d is formed on both arms constituting the second MZ type optical waveguide 3a and the bias voltage from the bias supply parts 12-2 and 12-3 is supplied via the bias-T 13-2 on top of others along with the second driving voltage signal from the driver 8-2.

Therefore, the aforementioned electrodes 2d are a first superimposed voltage electrode section adapted to supply a first superimposed voltage in which a first driving voltage signal and a first bias control voltage for bias control for modulation by the first driving voltage signal are superimposed in the first MZ type optical waveguide 2a. The electrodes 3d, on the other hand, are a second superimposed voltage electrode section adapted to supply a second superimposed voltage in which a second driving voltage signal and a second bias control voltage for bias control for modulation by the second driving voltage signal are superimposed in the second MZ type optical waveguide 3a.

The aforementioned bias-T 13-1 is a first voltage superimposing part adapted to superimpose a first driving voltage signal generated in the driver 8-1 and a first bias control voltage generated in the bias supply part 12-1 and applies the obtained voltage as a first superimposed voltage to the electrodes 2d as the first superimposed voltage electrode section. The bias-T 13-2, on the other hand, is a second voltage superimposing part adapted to superimpose a second driving voltage signal generated in the driver 8-2 and a second bias control voltage generated in the bias supply part 12-2 and applies the obtained voltage as a second superimposed voltage to the electrodes 3d as the second superimposed voltage electrode section. Then, a phase-shift voltage generated in the bias supply part 12-3 is further superimposed on the electrode 3d, which belongs to at least one of the first and second voltage superimposing parts.

The bias-T 13-2 of the DQPSK modulator 21 in the second embodiment superimposes a bias voltage for phase shift output from the bias supply part 12-3 (with a substantial phase shift amount $\phi = \pi/2$) on a second driving electric signal (differential voltage signal) from the driver 8-2 along with a bias voltage for stabilizing operating points from the bias supply part 12-2 for application to the electrodes 3d.

Since, at this point, the bias voltage for phase shift can be supplied to the electrode 3d formed on both arms constituting the second MZ type optical waveguide 3a via the bias-T 13-2 in the bias supply part 12-3, equivalent phase shifts can be provided to signal lights propagating through both arms of the second MZ type optical waveguide 3a.

The first and second MZ type light modulators 22 and 23 are provided with the electrodes 2d and 3d for modulation/bias shared use and accordingly, a waveguide space reserved for forming the bias electrodes 2c and that reserved for forming the bias electrodes 3c in the aforementioned FIG. 1 can be left out to achieve reduction in device size. By including the waveguide spaces reserved for forming the bias electrodes 2c and 3c in a formation area of the aforementioned electrodes 2d and 3d, electrode lengths required for the electrodes 2d and 3*d* can be increased while maintaining the existing device size, further reducing power consumption.

In the DQPSK modulator 21 according to the second embodiment constructed as described above, the data signal (DATA1) output from the DQPSK signal source 7 is amplified by the driver 8-1 of differential output and then output to the bias-T 13-1 as a first driving electric signal. The data signal (DATA2) output from the DQPSK signal source 7, on the other hand, is amplified by the driver 8-2 of differential output and then output to the bias-T 13-2 as a second driving electric signal.

Then, in the bias-T 13-1, the first driving voltage signal from the driver 8-1 and the bias voltage for stabilizing operating points from the bias supply part 12-1 under control of the ABC circuit part 10 are superimposed before being supplied to the electrodes 2*d*. Accordingly, in the first MZ type light modulator 22, light from the light source 5 is modulated by DATA1 from the DQPSK signal source 7 after stabilizing operating points with the bias voltage from the bias supply part 12-1 before being output as a DPSK-modulated optical signal.

In the bias-T 13-2, on the other hand, the second driving voltage signal from the driver 8-2, the bias voltage for stabilizing operating points from the bias supply part 12-2 under control of the ABC circuit part 10, and further the bias voltage for phase shift from the bias supply part 12-3 under control of the phase shift control part 11 are superimposed before being supplied to the electrodes 3*d*. Accordingly, in the second MZ type light modulator 23, light from the light source 5 is modulated by DATA2 from the DQPSK signal source 7 after stabilizing the operating points with the bias voltage from the bias supply part 12-2 before being output as a DPSK-modulated optical signal.

At this point, a phase shift can be provided by the bias voltage from the bias supply part 12-3 to the signal light from the second MZ type light modulator 23 to be multiplexed with the signal light from the first MZ type light modulator 22 in the multiplexing waveguide 4 so that the signal light substantially has a phase difference of $\pi/2$ with the signal light from the first MZ type light modulator 22.

Also with the DQPSK modulator 21 according to the second embodiment, a function corresponding to that of the $\pi/2$ phase shifter 104 (See FIG. 15) can be added to the electrodes 3*d* of the second MZ type light modulator 23, and therefore advantages similar to those of the first embodiment can be obtained.

Since the electrodes 2*d* and 3*d* for modulation/bias shared use are provided, a waveguide space reserved for forming the bias electrodes 2*c* and that reserved for forming the bias electrodes 3*c* in the aforementioned FIG. 1 can be left out to achieve reduction in device size. By including the waveguide spaces reserved for forming the bias electrodes 2*c* and 3*c* in a formation area of the aforementioned electrodes 2*d* and 3*d*, electrode lengths required for the electrodes 2*d* and 3*d* can be increased while maintaining the existing device size, advantageously reducing power consumption.

The bias voltage for phase shift is supplied to the electrodes 3*d* of the second MZ type light modulator 23 in the second embodiment, but may be supplied to the electrodes 2*d* of the first MZ type light modulator 22 through the bias-T 13-1.

[B1] Description of a First Modification of the Second Embodiment

Figure 9:
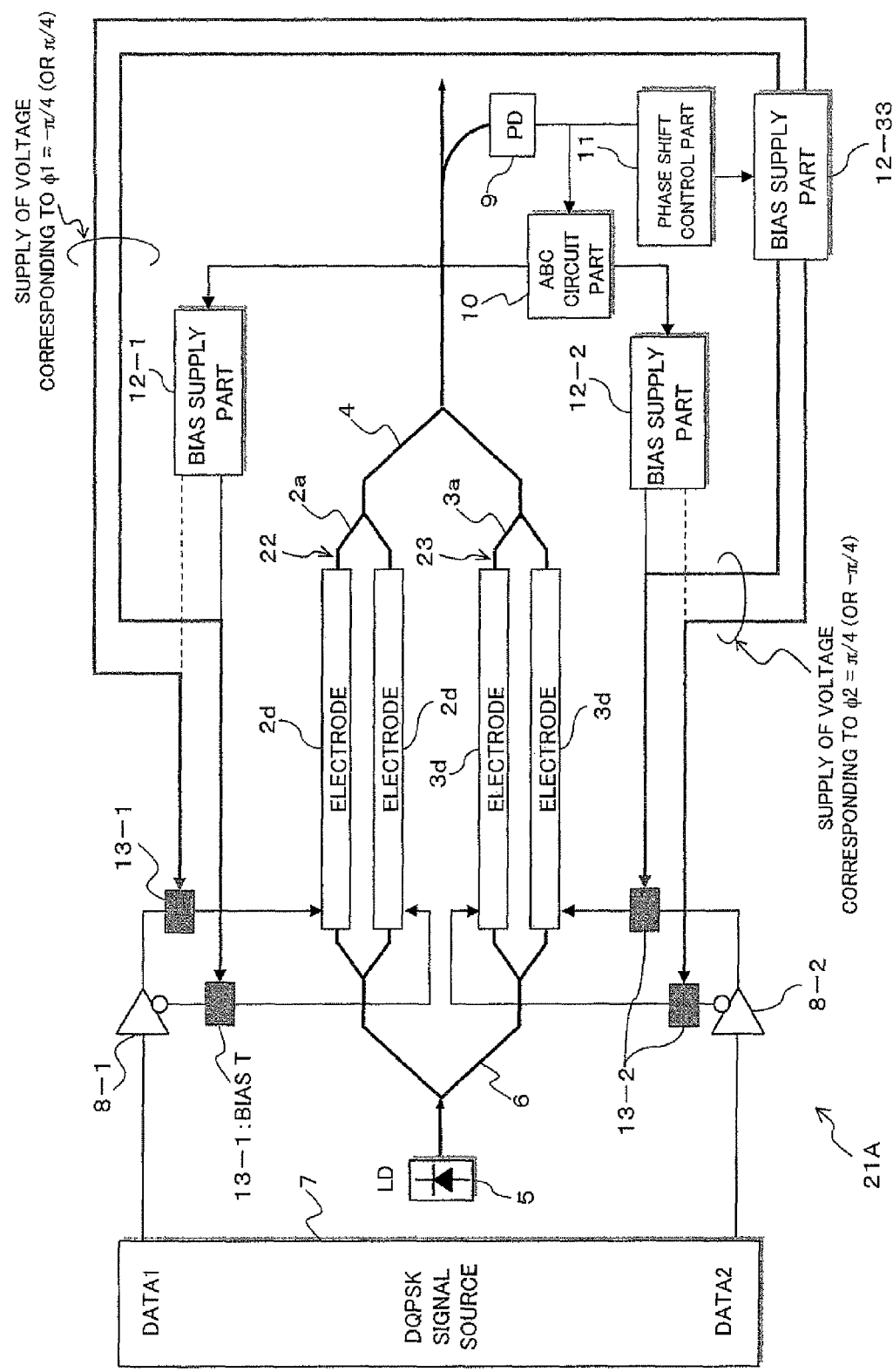
FIG. 9 to FIG. 14 are each diagrams showing modifications of the DQPSK modulator according to the second embodiment of the present invention.

FIG. 9 is a diagram showing a DQPSK modulator 21A according to a first modification of the second embodiment of the present invention. The DQPSK modulator 21A shown in FIG. 9 has, instead of the aforementioned bias supply part 12-3 shown in FIG. 8, a bias supply part 12-33 to supply a bias voltage for phase shift to the first and second MZ type light modulators 22 and 23 respectively under control of the phase shift control part 11 and is different from the DQPSK modulator 21 shown in FIG. 8 in this respect. Otherwise, the configuration is basically the same as that of the DQPSK modulator 21 shown in FIG. 8 and the same numerals in FIG. 9 as those in FIG. 8 denote approximately the same components.

That is, the bias supply part 12-33 applies, under control of the phase shift control part 11 a bias voltage for phase shift to the electrodes 2*d* formed on both arms constituting the first MZ waveguide 2*a* and a bias voltage for phase shift to the electrodes 3*d* formed on both arms constituting the second MZ waveguide 3*a*.

At this point, the bias voltage to be supplied to the electrodes 2*d* and the electrodes 3*d* respectively are set by the bias supply part 12-33 in such a way that two signal lights output from the first and second MZ type light modulators 22 and 23 to be multiplexed by the multiplexing waveguide 4 have a relative phase difference of $\pi/2$.

As shown in FIG. 9, for example, a bias voltage is supplied to the electrodes 2*d* so that a phase shift amount $\phi 1$ of signal light output from the multiplexing waveguide 4 through the first MZ type light modulator 22 becomes $\phi 1 = -\pi/4$ and a bias voltage is supplied to the electrodes 3*d* so that a phase shift amount $\phi 2$ of signal light output from the multiplexing waveguide 4 through the second MZ type light modulator 23 becomes $\phi 2 = \pi/4$. In this way, a relative phase difference of two signal lights output from the multiplexing waveguide 4 through the first and second MZ type light modulators 22 and 23 can be $\pi/2$. Meanwhile, allocation of the phase shift amounts to the first and second MZ type light modulators 22 and 23 may be reversed.

Figure 10:
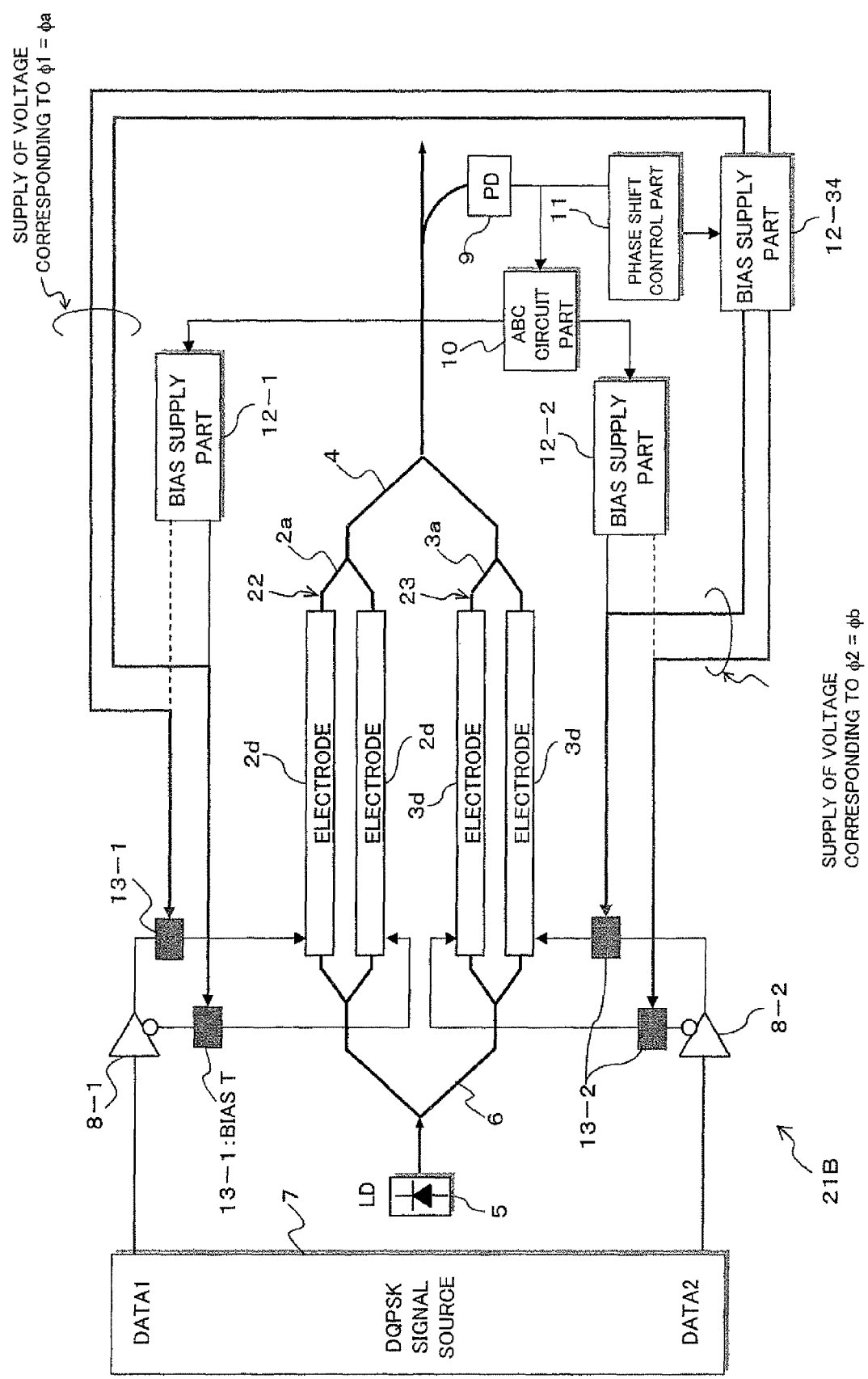

According to the present invention, the bias voltage supplied by the bias supply parts 12-31 and 12-32 respectively are such that the phase shift amounts become $\phi 1 = -\pi/4$ and $\phi 2 = \pi/4$ (or $\phi 1 = \pi/4$ and $\phi 2 = -\pi/4$), but as long as a relative phase difference of $\pi/2$ is obtained ($\phi 1 - \phi 2 = \pi/2$ or $-\pi/2$), like the DQPSK modulator 21B shown in FIG. 10, any combination of bias voltages supplied to the individual electrodes 2*d* and 3*d* by a bias supply part 12-34 may be set to produce other phase shift amounts $\phi 1 = \phi a$ and $\phi 2 = \phi b$.

Also with the DQPSK modulators 21A and 21B constructed as described above, in addition to advantages of the aforementioned second embodiment, the bias voltage required for phase shift can be divided among a plurality of the electrodes 2*d* and 3*d* of the MZ type light modulators 22 and 23, further contributing to reduction in power consumption.

[B2] Description of a Second Modification of the Second Embodiment

Figure 11:
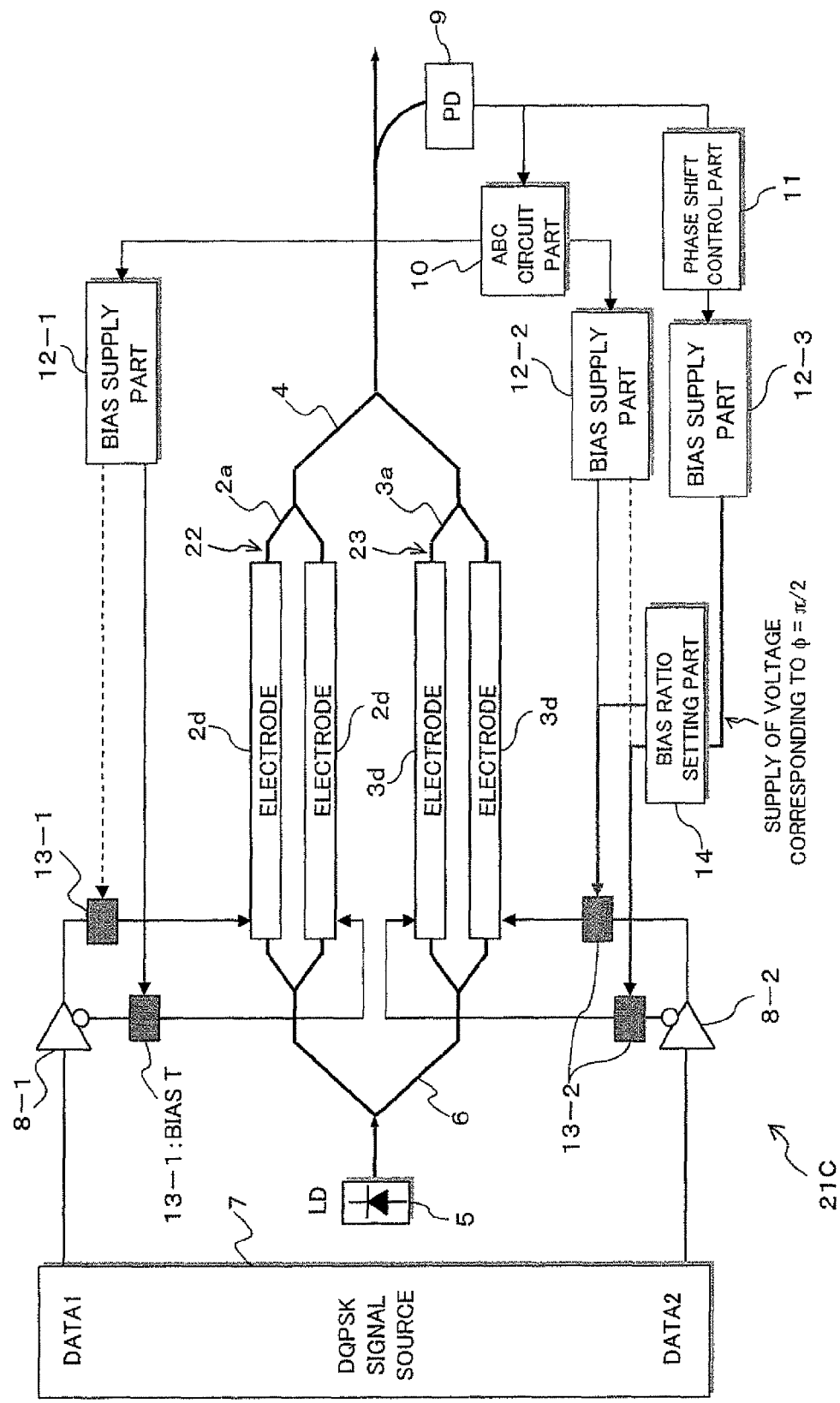

FIG. 11 is a diagram showing a DQPSK modulator 21C according to a second modification of the second embodiment of the present invention. The DQPSK modulator 21C shown in FIG. 11 is obtained by adding a bias ratio setting part 14 to the configuration of the aforementioned DQPSK modulator 21 shown in FIG. 8. The bias ratio setting part 14 corrects a deviation of a bias supply ratio due to individual differences for the two electrodes 3*d* to which a bias voltage for phase shift is supplied.

That is, by measuring in advance a loss difference, an electrode length difference, and the like that could become a factor for causing the bias supply ratio between the two electrodes 3*d* to differ, the allocation (bias ratio) of the bias voltage from the bias supply part 12-3 can thereby be set by the bias ratio setting part 14 to correct, based on these measurement results, a deviation of the bias supply ratio. The bias voltage whose bias ratio is set by the bias ratio setting part 14 is supplied to the corresponding electrode 3d via the bias-T 13-2.

Therefore, the aforementioned bias ratio setting part 14 is an application ratio setting part that sets the application ratio of a phase-shift voltage supplied to two electrodes 2d and 3d in each of the first and second Mach-Zehnder type light modulators 22 and 23.

The DQPSK modulator 21C constructed as described above is provided with the bias ratio setting part 14, and therefore a deviation from $\pi/2$ can be corrected by reducing a difference in bias supply ratio due to, for example, a loss between the two electrodes 3d of the second MZ type light modulator 23.

Figure 12:
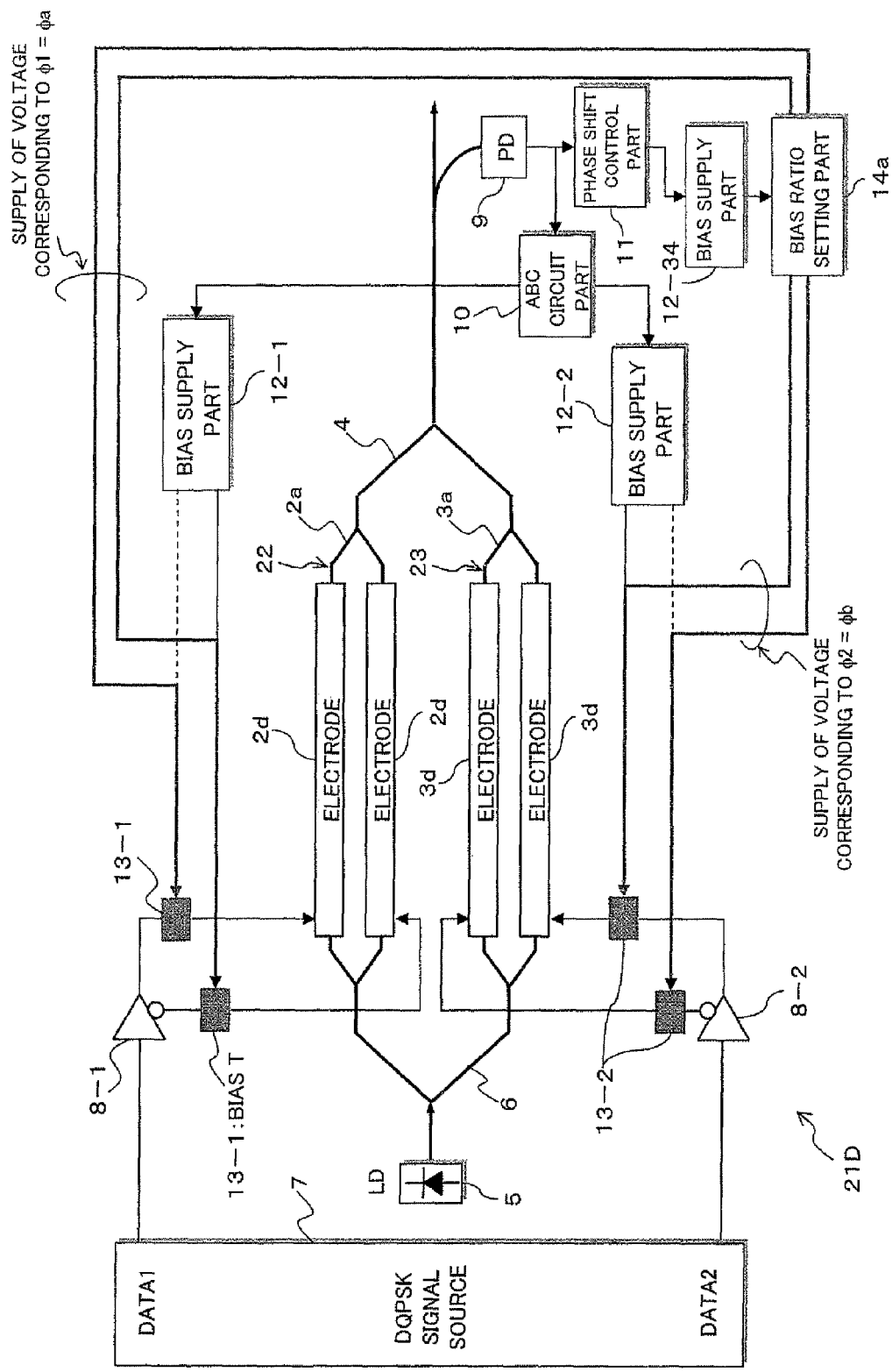

The configuration of the bias ratio setting part 14 can also be applied to the DQPSK modulators 21A and 21B shown in FIG. 9 and FIG. 10 respectively. For example, like the DQPSK modulator 21D shown in FIG. 12, a bias ratio setting part 14a as an application ratio setting part may be added to the configuration of the DQPSK modulator 21B shown in FIG. 10. The bias ratio setting part 14a shown in FIG. 12 corrects a deviation of the bias supply ratio due to individual differences for the two electrodes 2d and 3d each in the first and second MZ type light modulators 22 and 23 to which a bias voltage for phase shift is supplied.

By measuring in advance a loss difference, an electrode length difference, and the like that could become a factor for causing the bias supply ratio between the electrodes 2d and 3d to differ, the allocation (bias ratio) of the bias voltage from the bias supply part 12-34 can thereby be set by the bias ratio setting part 14a to correct, based on these measurement results, a deviation of the bias supply ratio.

That is, also with the DQPSK modulator 21D constructed as described above, the bias ratio setting part 14a is provided and therefore a deviation from $\pi/2$ can be corrected by reducing a difference in bias supply ratio due to, for example, a loss between the two electrodes 2d and 3d each of the first and second MZ type light modulators 22 and 23.

[B3] Description of a Third Modification of the Second Embodiment

Figure 13:
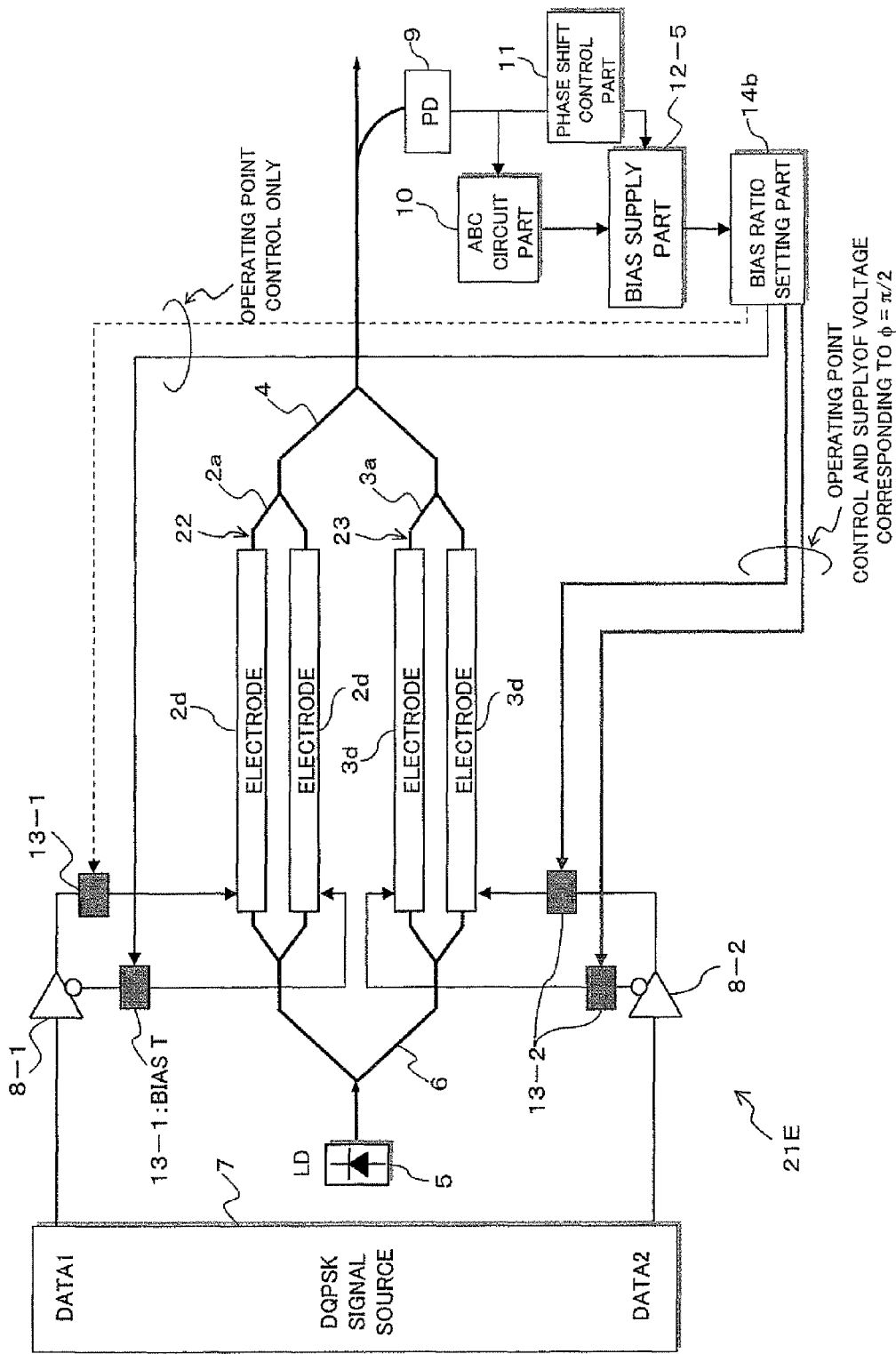

FIG. 13 is a diagram showing a DQPSK modulator 21E according to a third modification of the second embodiment of the present invention. The DQPSK modulator 21E shown in FIG. 13 is provided with a bias supply part 12-5 that makes the bias supply parts 12-1 to 12-3 in the aforementioned DQPSK modulator 21 shown in FIG. 8 shareable and also a bias ratio setting part 14b as an application ratio setting part, and is different from the aforementioned DQPSK modulator 21 shown in FIG. 8 in this respect. Otherwise, the configuration is basically the same as that of the DQPSK modulator 21 shown in FIG. 8 and the same numerals in FIG. 13 as those in FIG. 8 denote approximately the same components.

That is, the bias supply part 12-5 outputs a bias voltage for operating point control for the first and second MZ light modulators 22 and 23 based on control from the ABC control part 10 and also that for phase shift for the second MZ light modulator 23 based on control from the phase shift control part 11, and the bias ratio setting part 14b divides the bias voltage signal from the bias supply part 12-5 as a bias voltage signal to the two electrodes 2d and 3d each in the first and second MZ type light modulators 22 and 23 by setting the bias ratio in accordance with individual differences of the electrodes 2d and 3d.

More specifically, the bias voltage signal from the bias supply part 12-5 is divided into a bias voltage for operating point control for the first MZ type light modulator 22 and a bias voltage signal for operating point control and phase shift for the second MZ type light modulator 23, and further allocation (bias ratio) of the bias voltage from the bias supply part 12-5 is set to correct a deviation of the bias supply ratio based on individual differences of the two electrodes 2d and 3d each. The bias voltage whose bias ratio is set by the bias ratio setting part 14b is supplied to the corresponding electrode 2d via the bias-T 13-1 and to the corresponding electrode 3d via the bias-T 13-2.

Figure 14:
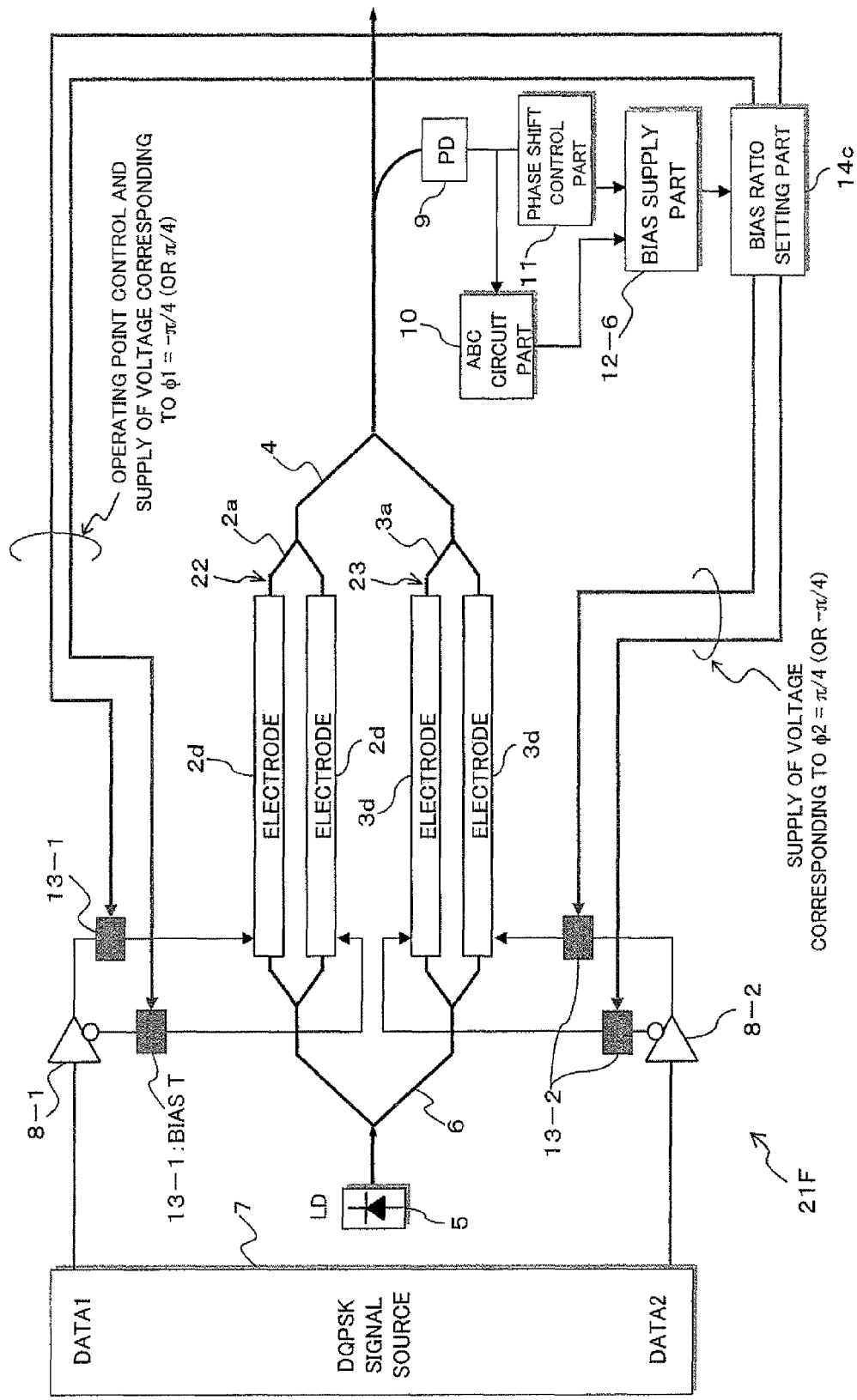

The configuration of the bias supply part made shareable as described above and that of the bias ratio setting part can be applied to the aforementioned DQPSK modulators 21A and 21B shown in FIG. 9 and FIG. 10 respectively. For example, as shown in a DQPSK modulators 21F shown in FIG. 14, a bias supply part 12-6 that makes the bias supply parts 12-1, 12-2, and 12-33 in the DQPSK modulator 21A shown in FIG. 9 shareable may be provided and also a bias ratio setting part 14c may be provided as an application ratio setting part.

That is, the bias supply part 12-6 outputs a bias voltage for operating point control for the first and second MZ type light modulators 22 and 23 based on control from the ABC circuit part 10 and also that for phase shift for the first and second MZ type light modulators 22 and 23 based on control from the phase shift control part 11, and the bias ratio setting part 14c divides the bias voltage signal from the bias supply part 12-6 as a bias voltage signal to the two electrodes 2d and 3d each in the first and second MZ type light modulators 22 and 23 by setting the bias ratio in accordance with individual differences of the electrodes 2d and 3d.

More specifically, the bias voltage signal from the bias supply part 12-6 is divided into a bias voltage (a bias voltage for operating point control and that for phase shift ($\phi 1 = -\pi/4$ or $\pi/4$)) for the first MZ type light modulator 22 and that (a bias voltage for operating point control and that for phase shift ($\phi 1 = \pi/4$ or $-\pi/4$)) for the second MZ type light modulator 23. Further, allocation (bias ratio) of the bias voltage from the bias supply part 12-6 is set to correct a deviation of the bias supply ratio based on individual differences of the two electrodes 2d and 3d each. The bias voltage whose bias ratio is set by the bias ratio setting part 14c is supplied to the corresponding electrode 2d via the bias-T 13-1 and to the corresponding electrode 3d via the bias-T 13-2.

Also with the DQPSK modulators 21E and 21F constructed as described above, the bias ratio setting part 14a is provided and therefore a deviation from $\pi/2$ can be corrected by reducing a difference in bias supply ratio due to, for example, a loss between the two electrodes 2d and 3d each of the first and second MZ type light modulators 22 and 23.

[C] Others

Configurations of the bias ratio setting part as an application ratio setting part shown in FIG. 11 to FIG. 14 can also be applied to each configuration of the first embodiment when necessary.

Further, a differential M ($2^2=4$) phase-shift modulator, that is, a DQPSK modulator with n=2 has been described in detail for each of the foregoing embodiments, but according to the present invention, a differential M ($M=2^n$) phase-shift modulator with n set equal to an integer 3 or greater is also applicable. In this case, n (n is 2 or more) Mach-Zehnder type light modulators each adapted to output a DPSK-modulated signal light by applying a driving voltage signal are arranged in parallel, a multiplexing waveguide adapted to output a DMPSK-modulated ($M=2^n$) light by multiplexing outputs of the n Mach-Zehnder type light modulators is provided, and a phase shift voltage to produce a phase shift difference of substantially $2\pi/M$ of the n signal lights to be multiplexed by the multiplexing waveguide is applied to the n Mach-Zehnder type light modulators together with the driving voltage signal.

With disclosures of the foregoing embodiments, those skilled in the art will be able to produce a device of the present invention.

What is claimed is:

1. A differential M phase-shift modulator in which n (n is an integer equal to or greater than 2 and M is $2^n$) Mach-Zehnder light modulators each adapted to output a DPSK-modulated signal light by applying a driving voltage signal are arranged in parallel; the modulator comprising:
   a multiplexing waveguide adapted to output a differential M phase-shift keying modulated light by multiplexing outputs of the n Mach-Zehnder light modulators, wherein
   the n Mach-Zehnder light modulators are adapted to be applied a phase-shift voltage together with the driving voltage signal, the phase-shift voltage causes a phase shift difference of substantially $2\pi/M$ for the n signal lights multiplexed by the multiplexing waveguide.

2. The differential M phase-shift modulator according to claim 1, wherein
   the n is set to 2 and the M to 4,
   a first Mach-Zehnder light modulator adapted to output a DPSK-modulated first signal light by applying a first driving voltage signal and
   a second Mach-Zehnder light modulator adapted to output a DPSK-modulated second signal light by applying a second driving voltage signal are arranged in parallel,
   the multiplexing waveguide is adapted to apply a DQPSK-modulated light by multiplexing outputs of the first and second Mach-Zehnder light modulators, and
   at least one of the first and second Mach-Zehnder light modulators are adapted to be applied a phase-shift voltage together with the driving voltage signal, the phase-shift voltage causes a phase difference of substantially $\pi/2$ between the first signal light and second signal light multiplexed by the multiplexing waveguide.

3. The differential M phase-shift modulator according to claim 2, wherein the first Mach-Zehnder light modulator comprises a first Mach-Zehnder optical waveguide, a first modulation electrode section adapted to apply the first driving voltage signal in the first Mach-Zehnder optical waveguide, and a first bias electrode section adapted to supply a first bias control voltage for bias control during modulation based on the first driving voltage signal, and the second Mach-Zehnder light modulator comprises a second Mach-Zehnder optical waveguide, a second modulation electrode section adapted to apply the second driving voltage signal in the second Mach-Zehnder optical waveguide, and a second bias electrode section adapted to supply a second bias control voltage for bias control during modulation based on the first driving voltage signal.

4. The differential M phase-shift modulator according to claim 3, wherein the phase-shift voltage is superimposed on the driving voltage signal corresponding to at least one of the first and second modulation electrode sections.

5. The differential M phase-shift modulator according to claim 4, further comprising:
   a phase-shift voltage generating part adapted to generate the phase-shift voltage; and
   a superimposing part adapted to couple the phase-shift voltage generated in the phase-shift voltage generating part to at least one of the first and second driving voltage signals.

6. The differential M phase-shift modulator according to claim 3, wherein the phase-shift voltage is superimposed on the bias control voltage corresponding to at least one of the first and second bias electrode sections.

7. The differential M phase-shift modulator according to claim 3;
   further comprising:
   a first driving voltage generating part adapted to generate the first driving voltage signal;
   a second driving voltage generating part adapted to generate the second driving voltage signal;
   a first bias control voltage generating part adapted to generate the first bias control voltage; and
   a second bias control voltage generating part adapted to generate the second bias control voltage.

8. The differential M phase-shift modulator according to claim 2, wherein the first Mach-Zehnder light modulator comprises a first Mach-Zehnder optical waveguide, and a first superimposed voltage electrode section adapted to supply a first superimposed voltage in which the first driving voltage signal and a first bias control voltage for bias control during modulation based on the first driving voltage signal are superimposed in the first Mach-Zehnder optical waveguide, and
   the second Mach-Zehnder light modulator comprises a second Mach-Zehnder optical waveguide, and a second superimposed voltage electrode section adapted to supply a second superimposed voltage in which the second driving voltage signal and a second bias control voltage for bias control during modulation based on the second driving voltage signal are superimposed in the second Mach-Zehnder optical waveguide.

9. The differential M phase-shift modulator according to claim 8, wherein a superimposed voltage obtained by further superimposing the phase-shift voltage is applied to at least one of the first and second superimposed voltage electrode sections.

10. The differential M phase-shift modulator according to claim 9, further comprising:
    a phase-shift voltage generating part adapted to generate the phase-shift voltage; and
    a superimposing part adapted to superimpose the phase-shift voltage generated in the phase-shift voltage generating part on at least one of the first and second superimposed voltages to be supplied to the first and second superimposed voltage electrode sections respectively.

11. The differential M phase-shift modulator according to claim 4;
    further comprising:
    a first driving voltage generating part adapted to generate the first driving voltage signal;
    a second driving voltage generating part adapted to generate the second driving voltage signal;
    a first bias control voltage generating part adapted to generate the first bias control voltage;
    a second bias control voltage generating part adapted to generate the second bias control voltage;
    a first voltage superimposing part adapted to superimpose the first driving voltage signal generated in the first driving voltage generating part and the first bias control voltage generated in the first bias control voltage generating part to apply the obtained voltage to the first superimposed voltage electrode section as the first superimposed voltage; and
    a second voltage superimposing part adapted to superimpose the second driving voltage signal generated in the second driving voltage generating part and the second bias control voltage generated in the second bias control voltage generating part to apply the obtained voltage to the second superimposed voltage electrode section as the second superimposed voltage, wherein at least one of the first and second voltage superimposing parts further superimposes the phase-shift voltage generated in the phase-shift voltage generating part.

12. The differential M phase-shift modulator according to claim 2, wherein the first and second Mach-Zehnder light modulators have each a Mach-Zehnder waveguide having two arm waveguides and also two electrodes adapted to apply an electric field to the two arm waveguides each, wherein the phase-shift voltage is supplied to the both electrodes in at least one of the first and second Mach-Zehnder light modulators.

13. The differential M phase-shift modulator according to claim 12, further comprising an application ratio setting part adapted to set an application ratio of the phase-shift voltage supplied to two electrodes in each of the first and second Mach-Zehnder light modulators.

14. The differential M phase-shift modulator according to claim 2, further comprising a demultiplexing waveguide adapted to demultiplex input light into two to output each to the first Mach-Zehnder light modulator and second Mach-Zehnder light modulator.

* * * * *